US012783439B2

(12) United States Patent
Nagao et al.

(10) Patent No.: US 12,783,439 B2
(45) Date of Patent: Nov. 3, 2026

(54) SEMICONDUCTOR DEVICE AND COMMUNICATION SYSTEM

(71) Applicant: ROHM CO., LTD., Kyoto (JP)

(72) Inventors: Kei Nagao, Kyoto (JP); Gregory Marc Castillo, Novi, MI (US)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 19/093,248

(22) Filed: Mar. 27, 2025

(65) Prior Publication Data

US 2025/0307185 A1 Oct. 2, 2025

(30) Foreign Application Priority Data

Mar. 28, 2024 (JP) ................................ 2024-052659
Mar. 28, 2024 (JP) ................................ 2024-052662

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC ............................ G06F 13/20; G06F 2213/40
See application file for complete search history.

(56) References Cited

U.S. PATENT DOCUMENTS 11,853,252 B2 * 12/2023 Rennig ............... G06F 13/4072
11,977,508 B2 * 5/2024 Barrenscheen ......... G06F 13/20
12,337,357 B2 * 6/2025 Lopiccolo .............. B08B 9/023
2008/0002735 A1 * 1/2008 Poirier .................. H04L 12/403
370/445
2016/0217099 A1 * 7/2016 McCabe ............. G06F 13/4063
2020/0034319 A1 * 1/2020 Chang .................... G02B 1/041
2023/0053564 A1 * 2/2023 Dvorak ................. G06F 13/385
2024/0163141 A1 * 5/2024 Nagao ..................... H04L 25/40

FOREIGN PATENT DOCUMENTS

JP 2017224946 A 12/2017

* cited by examiner

*Primary Examiner* — Henry Tsai
*Assistant Examiner* — Christopher A Daley
(74) *Attorney, Agent, or Firm* — Fish & Richardson P.C.

(57) ABSTRACT

In the semiconductor device, when bridge select data contained in received data indicates on status of through output of bit data, i.e. output of bit data as it is intact, between a first bus and a second bus, first device-dedicated data contained in the received data is through-outputted to the second bus, and moreover, when the bridge select data indicates on status of the through output and when communication by a specified second serial communication method dedicated to the first device has been set to the semiconductor device, a clock signal synchronized with the through-outputted data as well as a chip select signal are outputted.

21 Claims, 22 Drawing Sheets

Fig.12A

| BRIF SEL | Operation |
|---|---|
| 0 | UART |
| 1 | SPI |

Fig.12B

| CPOL | Operation |
|---|---|
| 0 | Rising edge |
| 1 | Falling edge |

Fig.12C

| CSF | Operation |
|---|---|
| 0 | Low active |
| 1 | High active |

Fig.12D

| CPOLR | Operation |
|---|---|
| 0 | Rising edge |
| 1 | Falling edge |

Fig.22

| BRMODE | Operation |
|---|---|
| 0 | Bridge data: start 1bit, data 8bits, stop 1bit |
| 1 | Bridge data: start 1bit, data 9bits, stop 1bit |
| 2 | Bridge data: start 1bit, data 10bits, stop 1bit |
| 3 | |

SEMICONDUCTOR DEVICE AND COMMUNICATION SYSTEM

BACKGROUND OF THE INVENTION

This application claims priority under 35 U.S.C. § 119 (a) on Patent Applications No. 2024-052659 filed in Japan on Mar. 28, 2024 and No. 2024-052662 filed in Japan on Mar. 28, 2024, the entire contents of which are hereby incorporated by reference.

FIELD OF THE INVENTION

The present disclosure relates to a semiconductor device.

DESCRIPTION OF THE RELATED ART

Semiconductor devices equipped with serial communication functions have been widely utilized in a variety of applications. An example of circuit technologies related to the serial communication is disclosed in JP 2017-224946 A.

BRIEF DESCRIPTION OF DRAWINGS

FIG. 12A is a table showing communication method setting information BRIFSEL;

FIG. 12B is a table showing clock edge setting information CPOL;

FIG. 12C is a table showing chip select signal setting information CSF;

FIG. 12D is a table showing clock edge setting information CPOLR;

FIG. 22 is a chart showing an example of bridge mode information BRMODE.

DESCRIPTION OF THE PREFERRED EMBODIMENTS

Hereinafter, exemplary embodiments of the present disclosure will be described with reference to the accompanying drawings.

Disclosure of First Technology

<1. Communication System>

Figure 1:
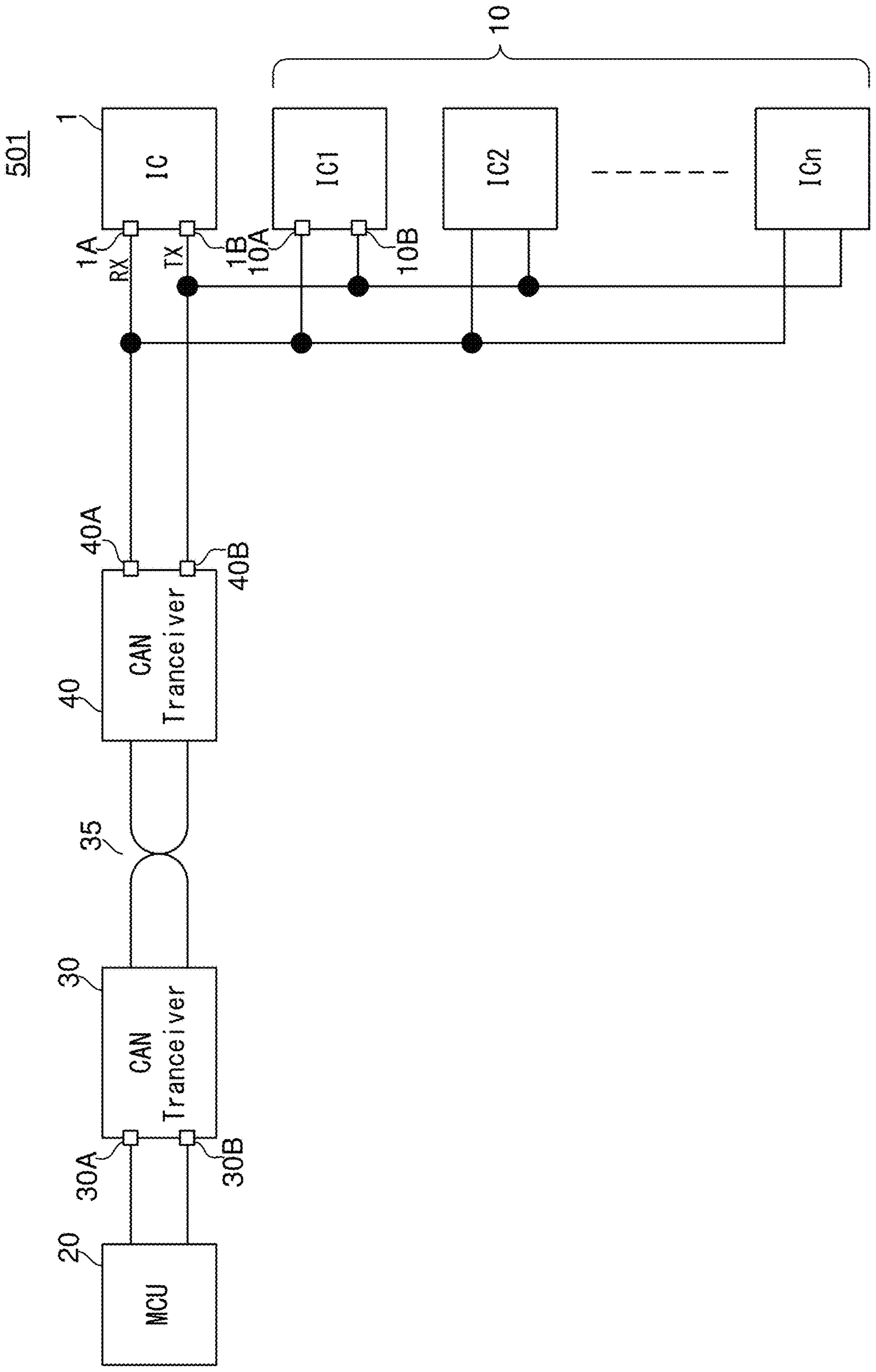
FIG. 1 is a view showing a configuration of a communication system according to a first comparative example.

FIG. 1 is a view showing a configuration of a communication system 501 according to a first comparative example in contrast to embodiments of the present disclosure. The communication system 501 includes an MCU (Micro Controller Unit) 20, a CAN (Controller Area Network) transceiver 30, a CAN transceiver 40, a semiconductor device 1, and n (where n is an integer of 1 or more) devices 10. The communication system 501 is for on-vehicle use as an example, and this is applicable also to other communication systems that will be described hereinafter.

Between the MCU 20 and the CAN transceiver 30, communications by UART (Universal Asynchronous Receiver/Transmitter) as a communication method are performed. UART is a format for exchanging serial data between two devices. UART allows two-way communications to be implemented by two lines between transmitter and receiver side.

Between the CAN transceivers 30 and 40, communications by a CAN bus 35 are performed. CAN is a serial communications protocol standardized in International Standard ISO11898 and others. Between the CAN transceiver 40 and the semiconductor device 1 plus the n devices 10, communications by UART are performed.

The CAN transceiver 30 has a TXD (transmitted data input) pin 30A and an RXD (received data output) pin 30B. The CAN transceiver 30 outputs data, which has been inputted to the TXD pin 30A, to the CAN bus 35, and outputs data, which has been inputted through the CAN bus 35, from the RXD pin 30B.

The CAN transceiver 40 has an RXD pin 40A and a TXD pin 40B. The CAN transceiver 40 outputs data, which has been inputted to the TXD pin 40B, to the CAN bus 35, and outputs data, which has been inputted through the CAN bus 35, from the RXD pin 40A.

The semiconductor device 1, which is an IC (Integrated Circuit) with circuits of specified functions integrated thereon, is made up, for example, as an LED (Light Emitting Diode) driver IC. Each of the n devices 10, which is an IC with circuits of specified functions integrated thereon, is made up, for example, as a matrix switch IC.

The semiconductor device 1 has an RX (received data input) pin 1A and a TX (transmitted data output) pin 1B. Each device 10 has an RX pin 10A and a TX pin 10B. The RX pin 1A and the n RX pins 10A are commonly connected to the RXD pin 40A. The TX pin 1B and the n TX pins 10B are commonly connected to the TXD pin 40B.

In the first comparative example shown in FIG. 1, both the semiconductor device 1 and the n devices 10 are compatible with one identical protocol, so that the semiconductor device 1 and the n devices 10 can be commonly connected to the identical CAN transceiver 40. Received data RX outputted from the RXD pin 40A is inputted to the RX pin 1A and the n RX pins 10A. A device address of any one out of the semiconductor device 1 and the n devices 10 is assigned in the received data RX. Also, transmitted data TX outputted from the TX pin 1B and the n TX pins 10B are inputted to the TXD pin 40B.

However, given that the semiconductor device 1 and the n devices 10 differ from each other in terms of their compatible protocol, there arises a difficulty in compatibility with the configuration of the first comparative example shown in FIG. 1. Accordingly, in such cases, a configuration of a second comparative example as shown in FIG. 2 may be adopted.

Figure 2:
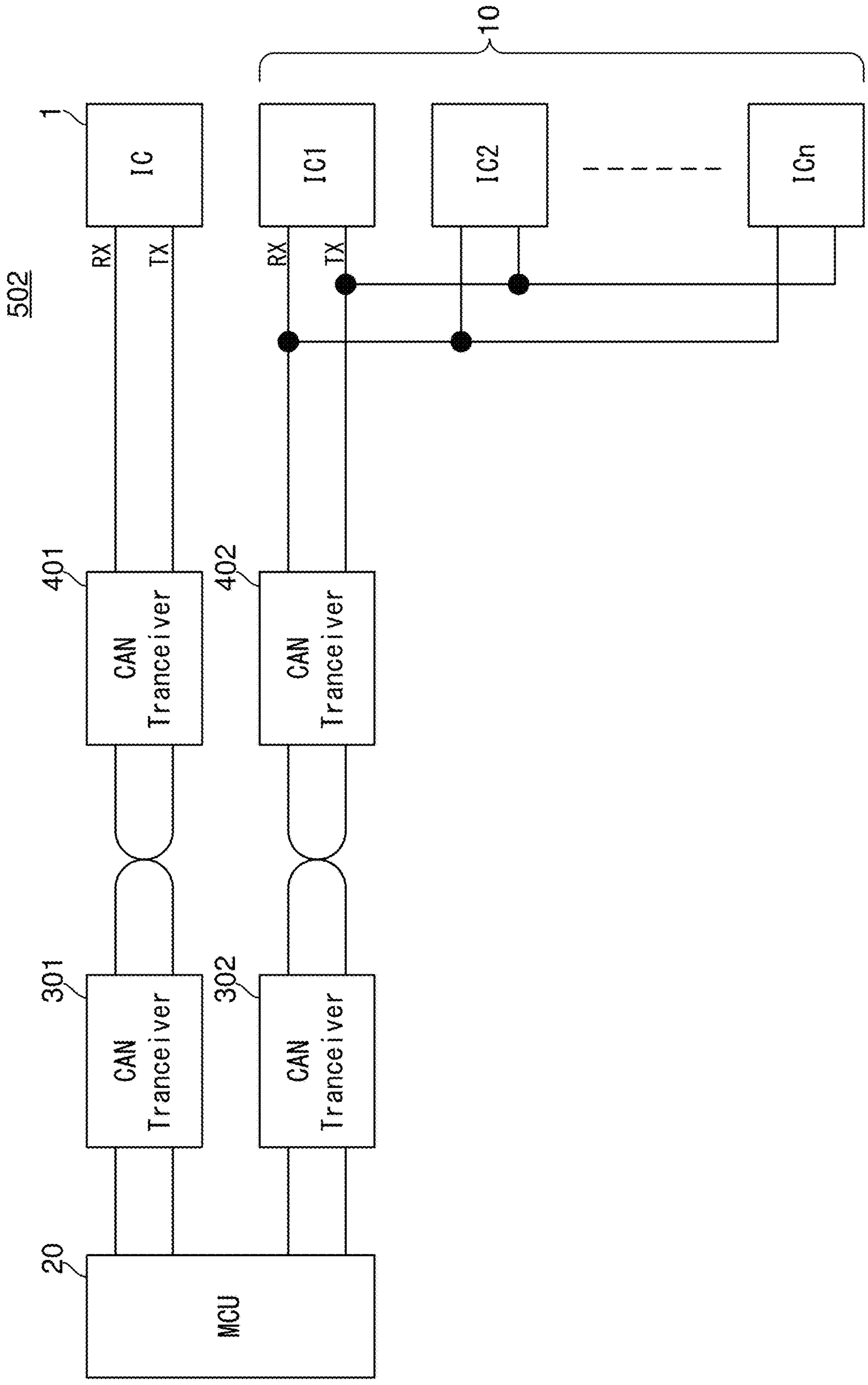
FIG. 2 is a view showing a configuration of a communication system according to a second comparative example.

A communication system 502 according to the second comparative example shown in FIG. 2 differs from the first comparative example in that CAN transceivers 301, 302 are used instead of the CAN transceiver 30 and moreover CAN transceivers 401, 402 are used instead of the CAN transceiver 40. The semiconductor device 1 is connected to the MCU 20 via the CAN transceiver 301 and the CAN transceiver 401, and the n devices 10 are connected to the MCU 20 via the CAN transceiver 302 and the CAN transceiver 402. The CAN transceivers 401, 402 perform CAN communications with the CAN transceivers 301, 302, respectively.

As described above, grouping of different-in-protocol devices (a group of the semiconductor device 1, and a group of n devices 10) makes it implementable to perform communication control by using devices of different protocols. However, an increase in number of CAN transceivers exemplified by the CAN transceivers 301, 302, 401, 402, as well as an increase in quantities of interconnect, give rise to a challenge of cost increases.

Figure 3:
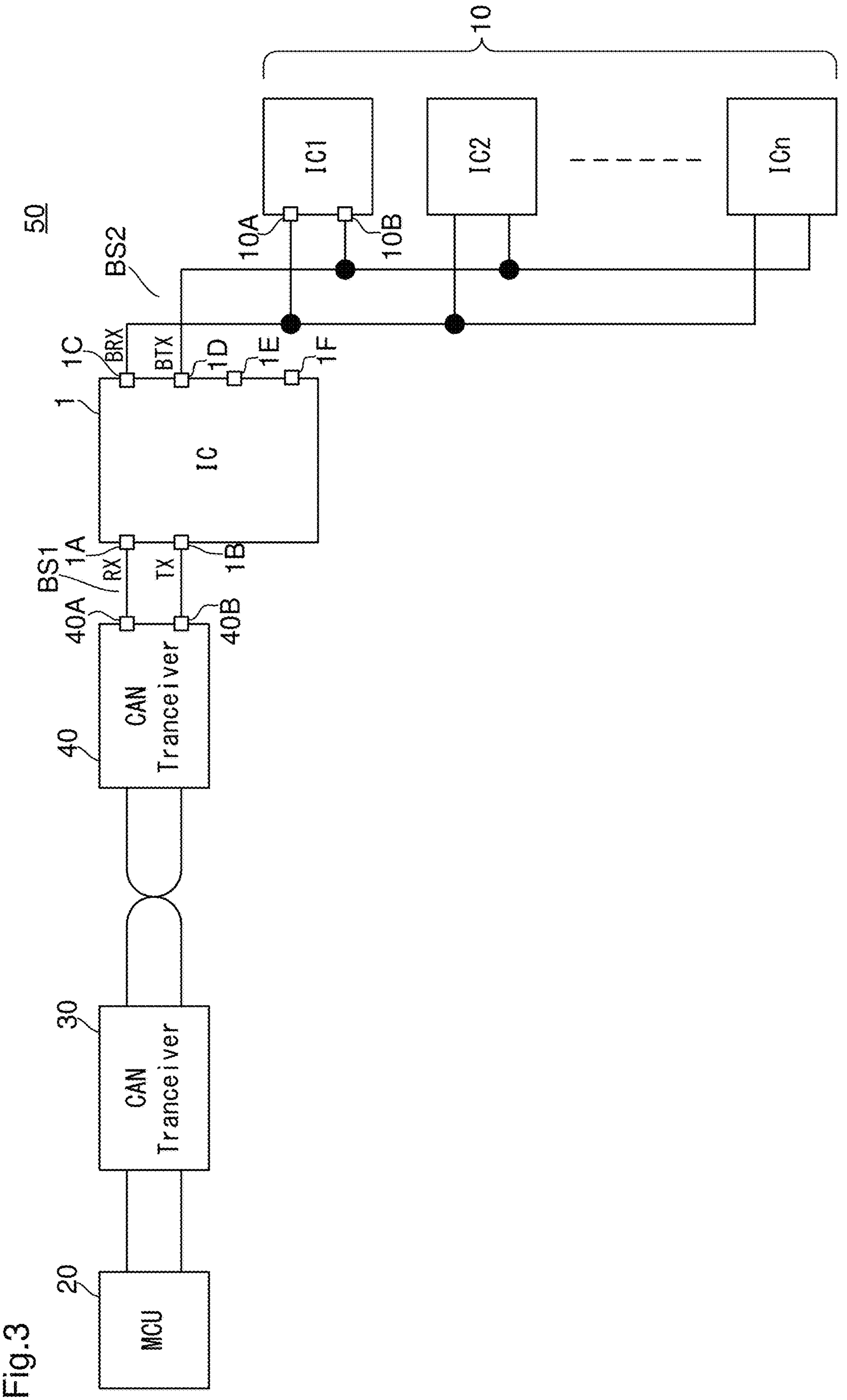
FIG. 3 is a view showing a configuration of a communication system according to an exemplary embodiment of the present disclosure.

Therefore, with a view to solving these and other problems, embodiments of the present disclosure as will be described below are carried out. FIG. 3 is a view showing a configuration of a communication system 50 according to an exemplary embodiment of the disclosure.

With the configuration shown in FIG. 3, UART communications are performed between the CAN transceiver 40, the semiconductor device 1, and the n devices 10. The semiconductor device 1 has an RXD (received data output) pin 1C and a TXD (transmitted data input) pin 1D in addition to the RX pin 1A and the TX pin 1B. The RX pin 1A is connected to the RXD pin 40A of the CAN transceiver 40. The TX pin 1B is connected to the TXD pin 40B of the CAN transceiver 40. That is, the RX pin 1A and the TX pin 1B are connected to the RXD pin 40A and the TXD pin 40B, respectively, by a bus BS1. Communications of received data RX and transmitted data TX are enabled via the bus BS1. The received data RX and the transmitted data TX are serial data.

The RXD pin 1C is connected to RX pins 10A of the n devices 10. The TXD pin 1D is connected to TX pins 10B of the n devices 10. That is, the RXD pin 1C and the TXD pin 1D are connected to the RX pins 10A and the TX pins 10B, respectively, by a bus (local bus) BS2. Communications of received data BRX and transmitted data BTX are enabled via the bus BS2. The received data BRX and the transmitted data BTX are serial data.

In addition, the semiconductor device 1 further has a CS pin (chip select pin) 1E and an SCK pin (clock pin) 1F. As described later, the CS pin 1E is a terminal for outputting a chip select signal, and the SCK pin 1F is a terminal for outputting a clock signal. As described later, the pins 1E, 1F are used when devices compatible with the SPI (Serial Peripheral Interface) communication method are used. When devices 10 compatible with UART are used as shown in FIG. 3, the pins 1E, 1F are not used.

In the configuration of the embodiment of the disclosure shown in FIG. 3, the semiconductor device 1 and the n devices 10 differ from each other in terms of compatible protocol. When the CAN transceiver 40 performs a write or read operation for the semiconductor device 1, received data RX outputted from the RXD pin 40A to the RX pin 1A consists of only data compatible with the protocol of the semiconductor device 1. It is noted here that a write operation refers to a process of writing data to a target device, and a read operation refers to a process of reading data from a target device. In a case of a read operation, the semiconductor device 1, upon receiving received data RX, outputs transmitted data TX from the TX pin 1B to the TXD pin 40B.

Meanwhile, when the CAN transceiver 40 performs a write or read operation for the devices 10, received data RX to be outputted from the RXD pin 40A to the RX pin 1A includes data compatible with the protocol of the devices 10. In this case, the semiconductor device 1, while turning on the bridge function, allows the data compatible with the protocol of the devices 10 included in the received data RX to be through-outputted from the RXD pin 1C as received data BRX. The terms 'through output' means to output bit data as it is intact. A device address of a device 10 is assigned in the received data BRX.

For a read operation, a device 10 as the target device (a device assigned by the device address) outputs transmitted data BTX from the TX pin 10B to the TXD pin 1D. The semiconductor device 1, because of the on-status bridge function, through-outputs the transmitted data BTX as transmitted data TX from the TX pin 1B.

According to this embodiment of the disclosure, as described above, even when the semiconductor device 1 and the devices 10 differ from each other in protocol, the CAN transceiver 40 is enabled to perform a write or read operation for the semiconductor device 1 and the devices 10. In contrast to the second comparative example (FIG. 2), it is implementable to reduce the number of CAN transceivers and reduce the quantity of interconnects, contributing to cost reduction.

<2. Configuration of Semiconductor Device>

Figure 4:
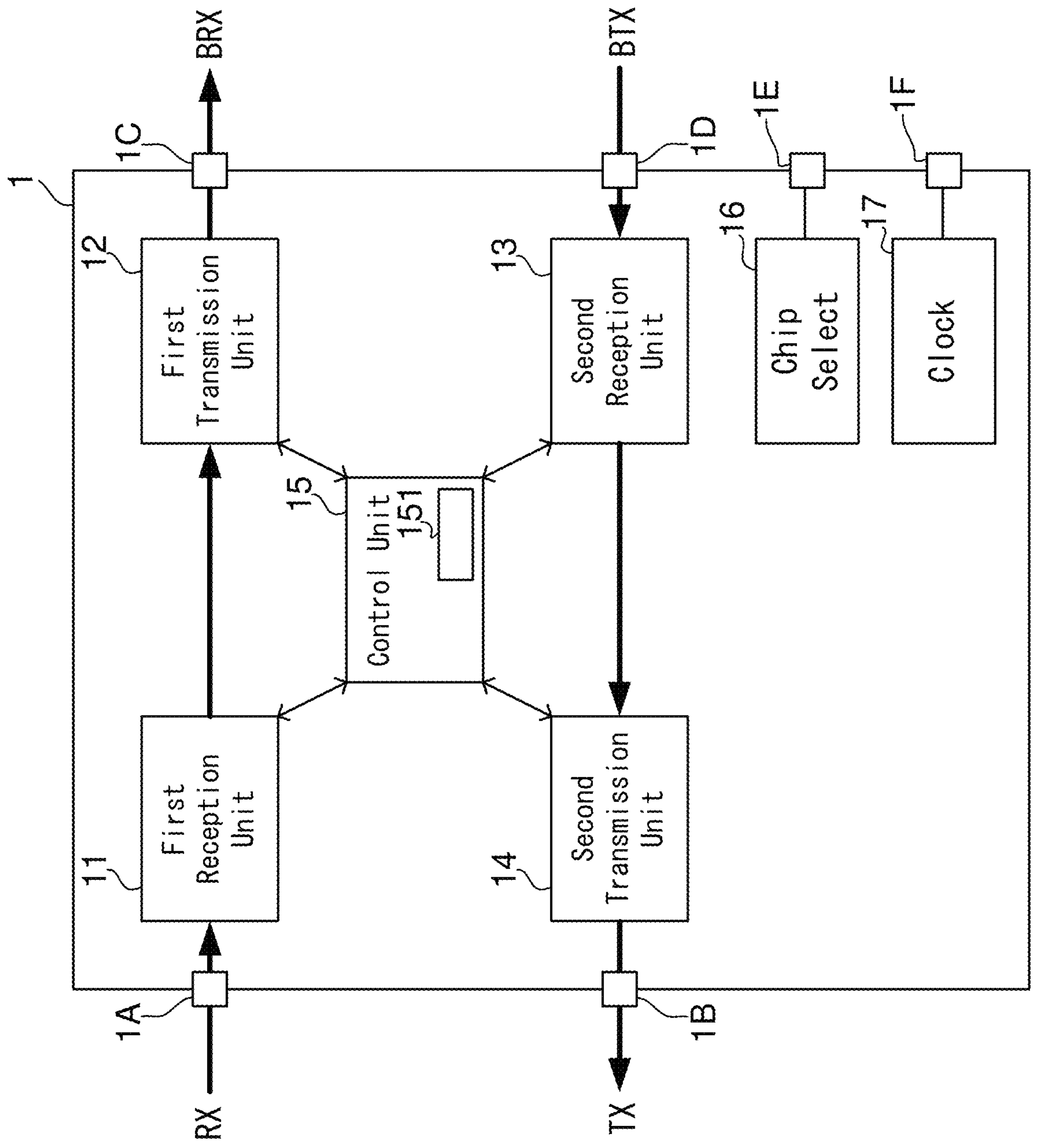
FIG. 4 is a block diagram of a semiconductor device according to an exemplary embodiment of the disclosure.

FIG. 4 is a block diagram of a semiconductor device 1 according to an exemplary embodiment of the disclosure. The semiconductor device 1 is equipped with a functional block including a first reception unit 11, a first transmission unit 12, a second reception unit 13, a second transmission unit 14, and a control unit 15. Whereas FIG. 4 depicts only a functional block related to communication functions, other functional blocks may also be included in the figure. For instance, the semiconductor device 1, when given by an LED driver, is equipped with a functional block related to LED drive.

The first reception unit 11 receives received data RX via an RX pin 1A. The first transmission unit 12 outputs received data BRX via an RXD pin 1C. The second reception unit 13 receives transmitted data BTX via a TXD pin 1D. The second transmission unit 14 outputs transmitted data TX via a TX pin 1B.

The control unit 15 controls the first reception unit 11, the first transmission unit 12, the second reception unit 13, and the second transmission unit 14. The control unit 15 includes a register 151.

Figure 5:
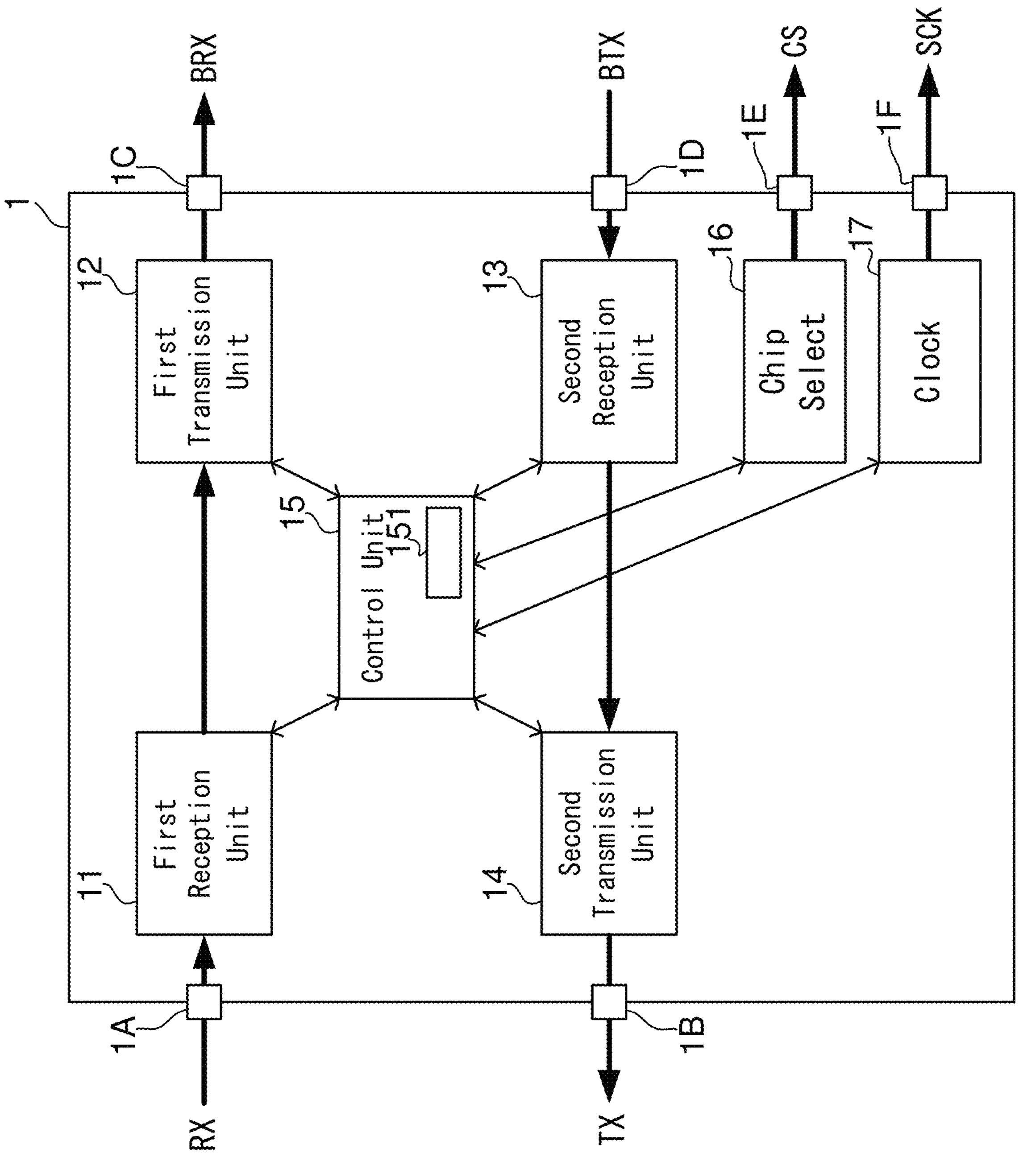
FIG. 5 is a block diagram of a semiconductor device according to an exemplary embodiment of the disclosure.

As shown in FIG. 4, the semiconductor device 1 further includes a chip select signal output unit 16 and a clock signal output unit 17. FIG. 4 is a diagram showing a state of the semiconductor device 1 in a case where the devices 10 compatible with UART are used as shown in FIG. 3. The chip select signal output unit 16 and the clock signal output unit 17 are not used under the state shown in FIG. 4. Meanwhile, FIG. 5 is a diagram showing a state of the semiconductor device 1 in a case where SPI-compatible devices are used as will be described later. As shown in FIG. 5, the chip select signal output unit 16 outputs a chip select signal CS via a CS pin 1E. The clock signal output unit 17 outputs a clock signal SCK via an SCK pin 1F. The chip select signal CS and the clock signal SCK are signals necessary for communications by SPI and are used together with the received data BRX and the transmitted data BTX.

<3. Construction of Received Data>

Figure 6:
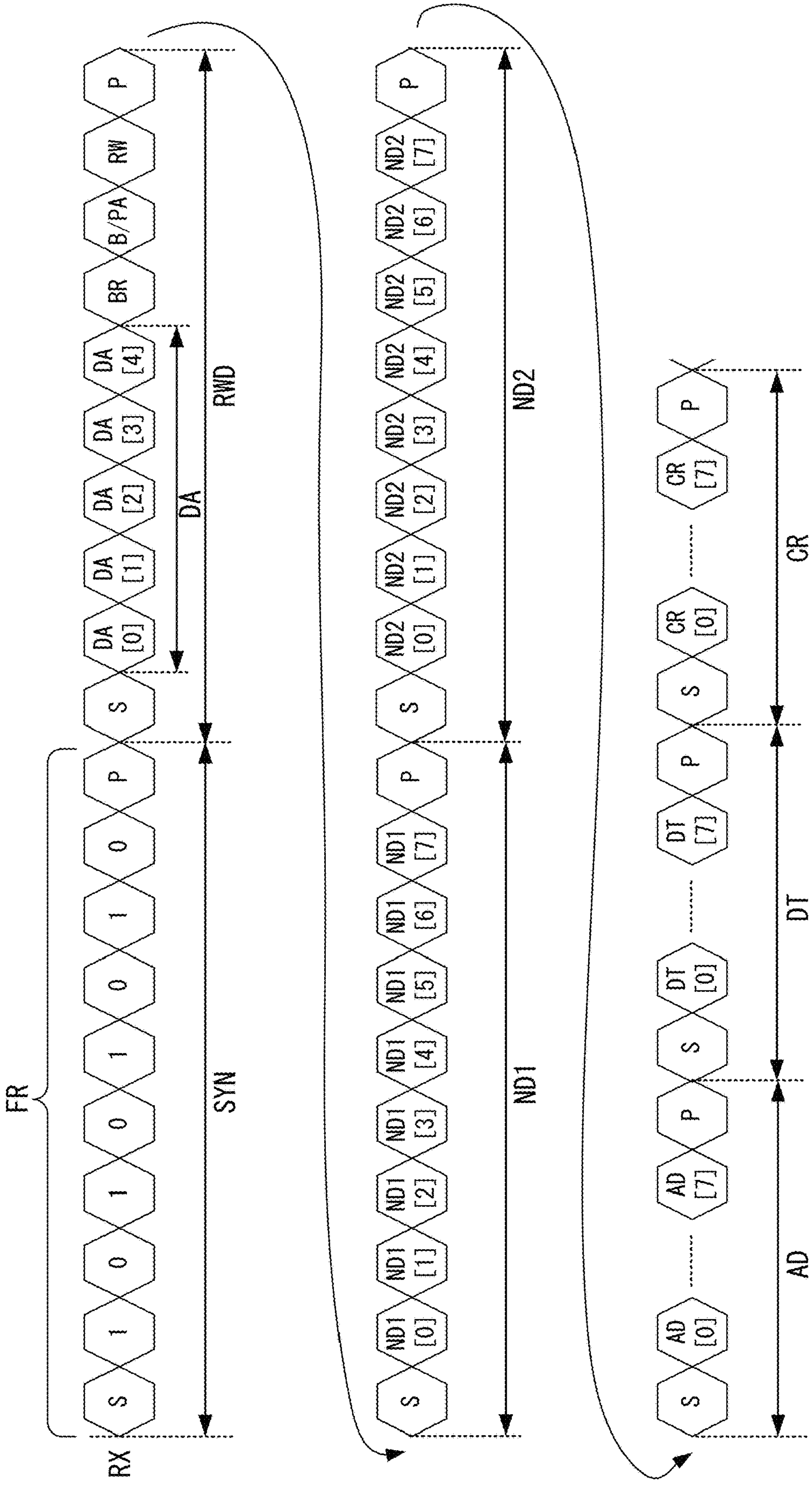
FIG. 6 is a view showing data construction of received data RX in a case where a write or read operation is performed with a semiconductor device 1 assigned as a target device.

FIG. 6 is a view showing data construction of received data RX in a case where a write or read operation is performed with the semiconductor device 1 assigned as a target device. The received data RX shown in FIG. 6 consists of only data compatible with a protocol of the semiconductor device 1.

In UART, communications are performed in data units called frame. As shown in FIG. 6, a frame FR consists of bit data ranging from a start bit S to a stop bit P. The start bit S goes low level, and the stop bit P goes high level. Bit data counting a specified number of bits are placed between the start bit S and the stop bit P. In the case of FIG. 6, 8-bit bit data are placed. That is, the frame FR is composed of bit data counting 10 bits.

As shown in FIG. 6, the received data RX includes a synchronization frame SYNC, a read/write etc. frame RWD, a first data number frame ND1, a second data number frame ND2, a register address frame AD, a data frame DT, and a CRC (Cyclic Redundancy Check) frame CR, in this order starting with the leading head.

The synchronization frame SYNC is bit data for setting a baud rate to the semiconductor device 1.

The read/write etc. frame RWD includes a device address DA, a bridge bit BR, a broadcast/parity bit B/PA, and a read/write bit RW. The device address DA is bit data indicating an address of a target device (semiconductor device 1) (5-bit data in the case of FIG. 6). The bridge bit BR is bit data indicating on/off status of the bridge function of the semiconductor device 1. The broadcast/parity bit B/PA is bit data indicating on/off status of broadcast or parity status of the device address DA in the semiconductor device 1. The read/write bit RW is bit data indicating read or write.

In this connection, a value of bridge bit BR=0 denotes off status of bridge function, i.e., normal mode (bridge function is set to off in received data RX shown in FIG. 6). In this case, the broadcast/parity bit B/PA indicates on/off status of broadcast. Broadcast/parity bit B/PA=0 indicates off status of broadcast, and broadcast/parity bit B/PA=1 indicates on status of broadcast.

Figure 7:
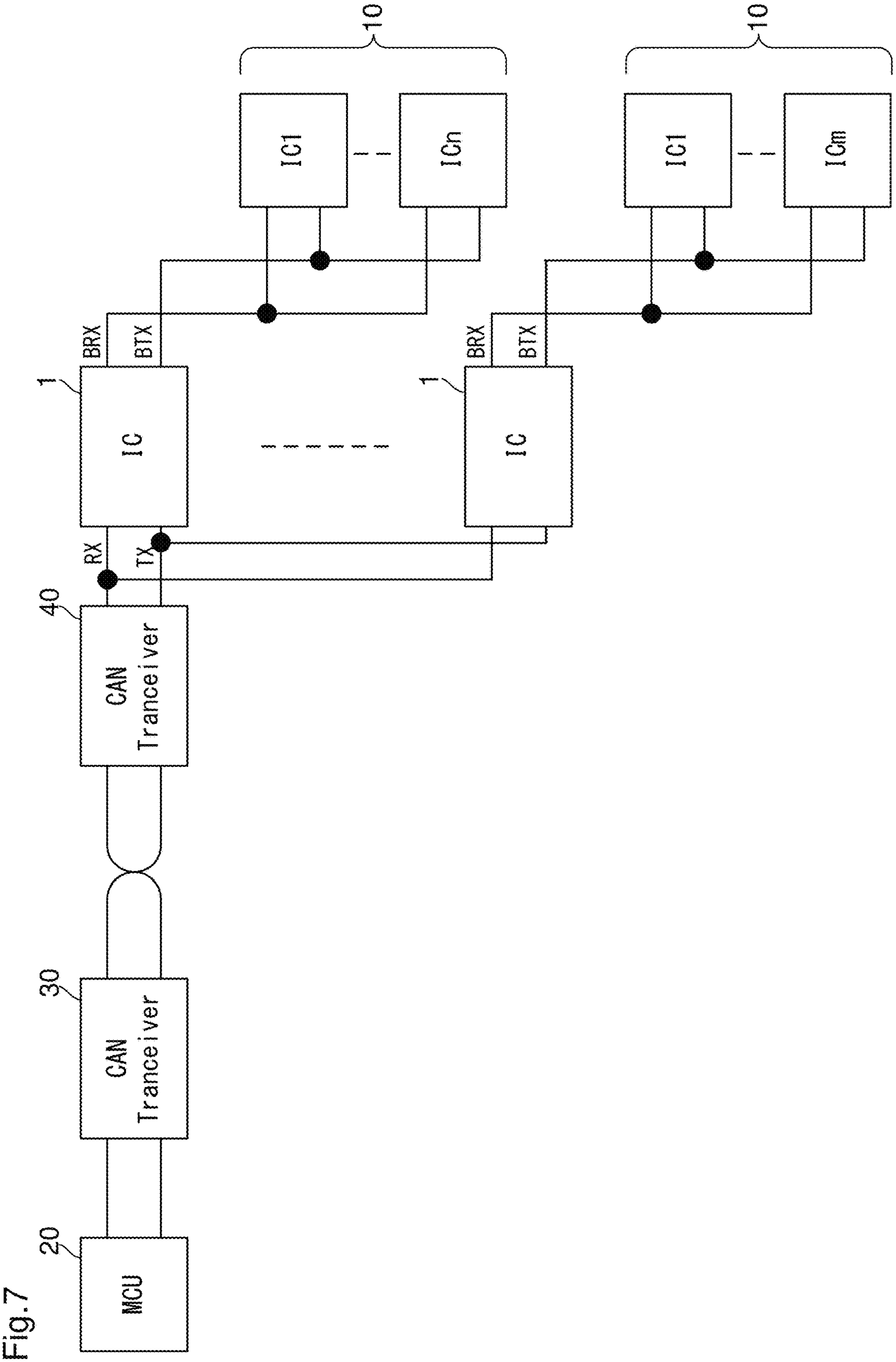
FIG. 7 is a view showing a configurational example of a communication system according to an embodiment of the disclosure.

In addition, for implementation of the broadcast of the semiconductor device 1, as shown in FIG. 7, a plurality of semiconductor devices 1 are connected to the CAN transceiver 40. Devices 10 are connected to each semiconductor device 1. Given that the broadcast is on, all of the plurality of semiconductor device 1 are target devices.

The expression, bridge bit BR=1, indicates on status of the bridge function (bridge function is set to on in later-described received data RX shown in FIG. 8). In this case, the broadcast/parity bit B/PA serves as a parity of the device address DA. As a result of this, it becomes possible to implement error detection of the device address DA. In addition, in the configuration shown in FIG. 7, given that the groups of devices 10 connected to the plurality of semiconductor devices 1, respectively, differ in protocol on the group basis, setting the broadcast of a semiconductor device 1 to on status would cause the same received data RX to be transmitted as received data BRX to devices 10 of different protocols, with a result that some of the devices 10 encounter a protocol incompatibility. Thus, when the bridge function is set on, the broadcast should be suppressed.

The first data number frame ND1 is bit data indicating a total number of frames. The second data number frame ND2 is bit data indicating a number of frames of write-dedicated data for a target device. For write processing on the target device, there is agreement between a frame number indicated by the second data number frame ND2 and a frame number indicated by the first data number frame ND1. For read processing on the target device, a frame number obtained by subtracting a frame number indicated by the second data number frame ND2 from a frame number indicated by the first data number frame ND1 results in a frame number of data (readout data) that is returned from the target device to the semiconductor device 1.

The register address frame AD is bit data indicating an address in the register 151. The data frame DT is bit data indicating data proper to be transmitted by received data RX. The CRC frame CR is bit data indicating an error detecting code to be added to the data frame DT.

Figure 8:
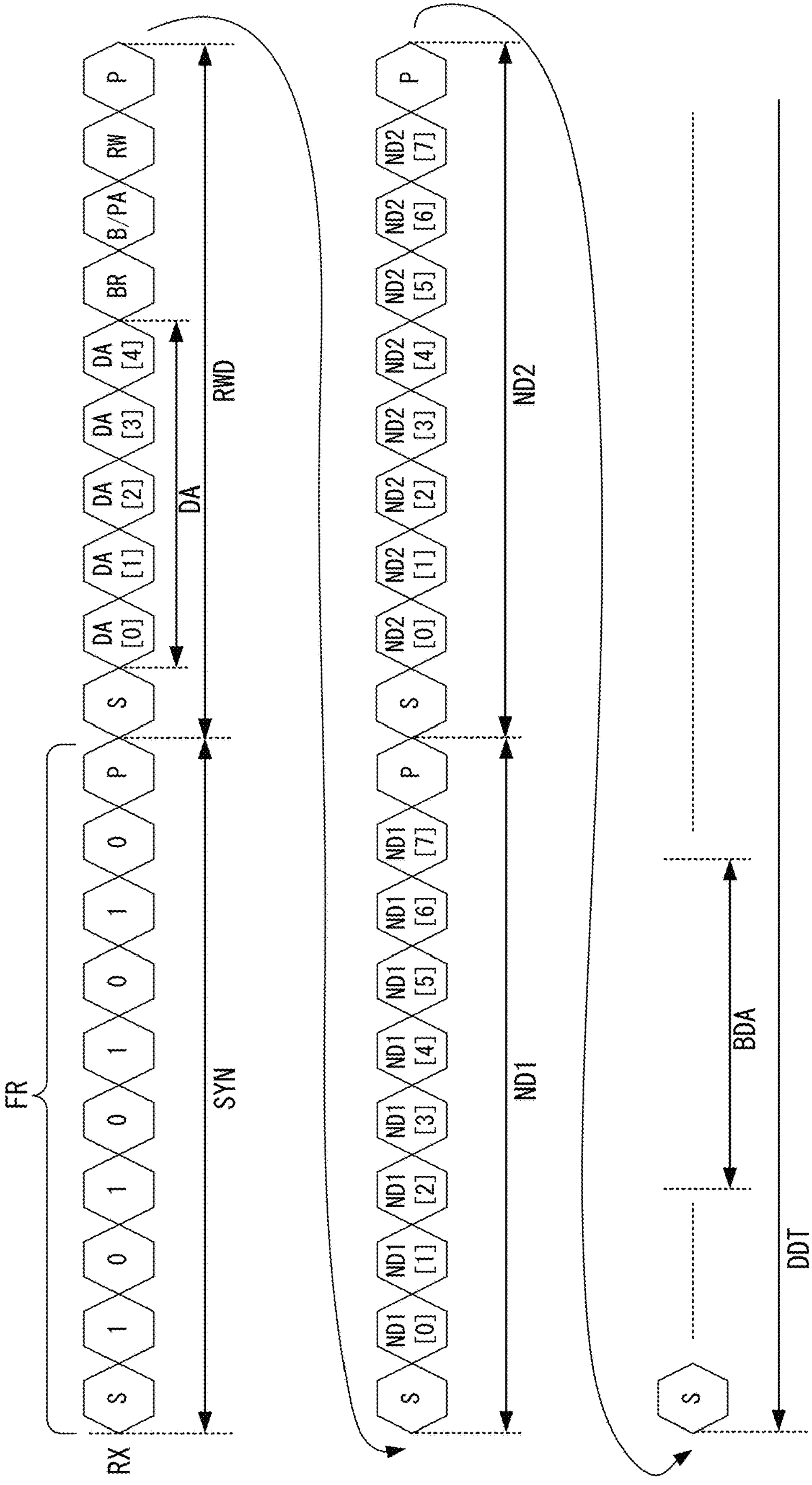
FIG. 8 is a view showing data construction of received data RX in a case where a write or read operation is performed with a device 10 assigned as a target device.

FIG. 8 is a view showing data construction of received data RX in a case where a write or read operation is performed with a device 10 assigned as a target device. The synchronization frame SYN and the read/write etc. frame RWD in the received data RX shown in FIG. 8 are as described before.

In the received data RX shown in FIG. 8, the second data number frame ND2 is succeeded by device data DDT. The device data DDT is data which is compatible with the protocol of the devices 10 and which is an object that is through-outputted as the received data BRX. The device data DDT includes a device address BDA. The device address BDA indicates an address of a device 10 that is a target device. In the device data DDT, the device address BDA is placed at a position corresponding to the protocol of the device 10.

<4. Through Output Control>

Here is described through output control by the semiconductor device 1, i.e., control under on status of the bridge function.

Figure 9:
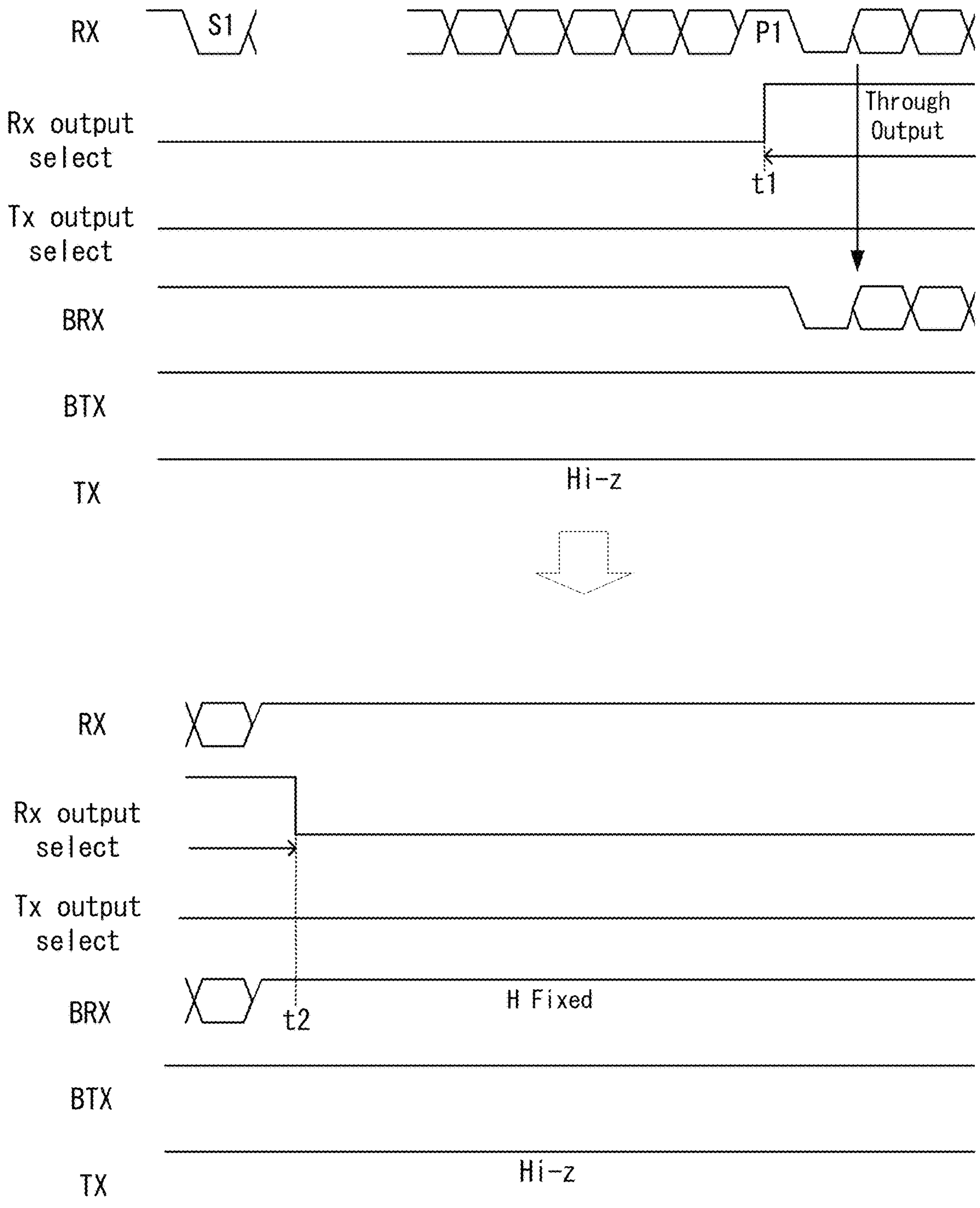
FIG. 9 is a timing chart showing communication control in a case where a write operation for a device 10 is performed.

FIG. 9 is a timing chart showing communication control in a case where a write operation is performed for a device 10. FIG. 9 shows, in descending order starting with the uppermost stage, received data RX, a received data output select signal (RX output select), a transmitted data output select signal (TX output select), received data BRX, transmitted data BTX, and transmitted data TX (this is applicable also to FIG. 10). The received data RX is of the construction shown in FIG. 8).

The received data RX is received by the first reception unit 11 (FIG. 4). Upon receiving a leading-head start bit S1 (low level) of the received data RX, the control unit 15 recognizes a reception start of the received data RX. Thereafter, the control unit 15 recognizes on status of the bridge function by the bridge bit BR contained in the received data RX, as well as recognizes a task of write by the read/write bit RW.

Thereafter, upon receiving the second data number frame ND2, the control unit 15 sets the received data output select signal in the register 151 from low to high level (timing t1) at the stop bit P1 of the second data number frame ND2. As a result, through output of the received data RX gets started, so that the first reception unit 11 and the first transmission unit 12 output the received data RX, as it is, as received data BRX. That is, device data DDT (FIG. 8) is through-outputted.

When the received data output select signal goes high level, the control unit 15 starts to count number of frames (i.e., number of frames of the device data DDT) of the received data RX under reception. When the counted frame number has reached a frame number indicated by the second data number frame ND2 that has been received, the control unit 15 changes over the received data output select signal to low level, stopping the through output (timing t2). From this afterward, the received data BRX is high-level fixed. In addition, in this case, the frame number indicated by the second data number frame ND2 and the frame number indicated by the first data number frame ND1 become identical to each other.

Figure 10:
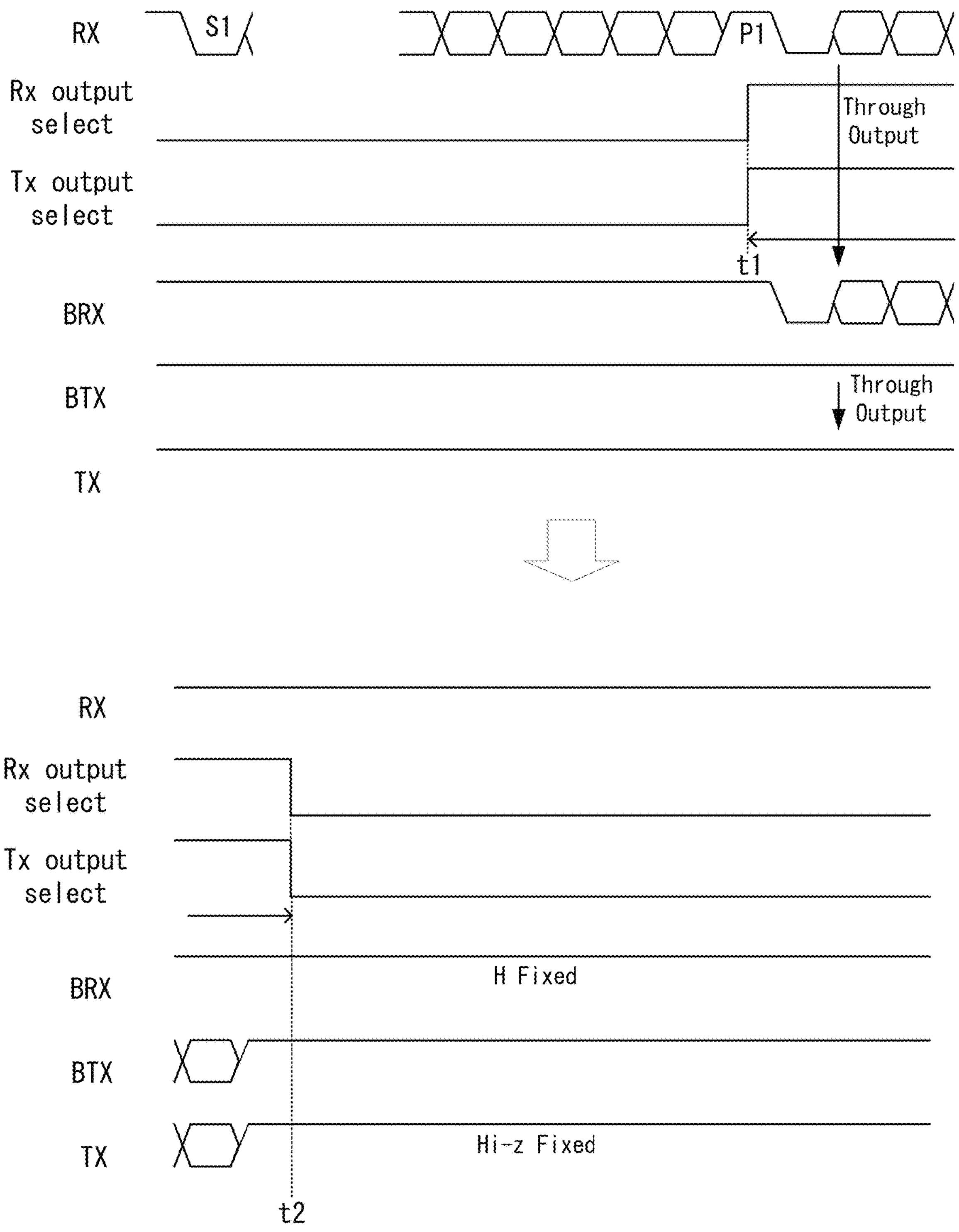
FIG. 10 is a timing chart showing communication control in a case where a read operation for the device 10 is performed.

FIG. 10 is a timing chart showing communication control in a case where a read operation is performed for a device 10. In this case, the received data RX is of the construction shown in FIG. 8.

Upon receiving the start bit S1 (low level) at the leading head of the received data RX, the control unit 15 recognizes on status of the bridge function by the bridge bit BR contained in the received data RX, as well as recognizes read status by the read/write bit RW.

Thereafter, upon receiving the second data number frame ND2, the control unit 15 sets both the received data output select signal and the transmitted data output select signal in the register 151 from low to high level (timing t1) at the stop bit P1 of the second data number frame ND2. As a result, through output of the received data RX and the transmitted data BTX gets started. The first reception unit 11 and the first transmission unit 12 output the received data RX, as it is, as received data BRX, i.e., device data DDT (FIG. 8) is through-outputted. After completion of the output of the received data BRX, the second reception unit 13 and the second transmission unit 14 through-output the transmitted data BTX, which is transmitted from the device 10, as transmitted data TX.

When both the received data output select signal and the transmitted data output select signal go high level, the control unit 15 starts to count number of frames of the received data RX under reception. When a sum of a frame number resulting from counting of the received data RX and a frame number resulting from counting the transmitted data BTX that is subsequently received has reached a frame number indicated by the first data number frame ND1, the control unit 15 changes over both the received data output select signal and the transmitted data output select signal to low level, stopping the through output (timing t2). From this afterward, the transmitted data TX is Hi-z (high impedance) fixed.

As described above, in this embodiment, a condition for an end of the through output can be given by the number of frames that the semiconductor device 1 has received. Particularly in this embodiment, even when transmission of the received data RX from the MCU 20 has been intercepted by interrupt process in the MCU 20, counting of the frame number stays paused during the interception, so that erroneous halting of the through output can be avoided. That is, since halting of the through output can be avoided independent of interrupt time, restrictions by specifications of the MCU 20 are less likely to be involved.

<5. Conversions Between UART and SPI>

Figure 11:
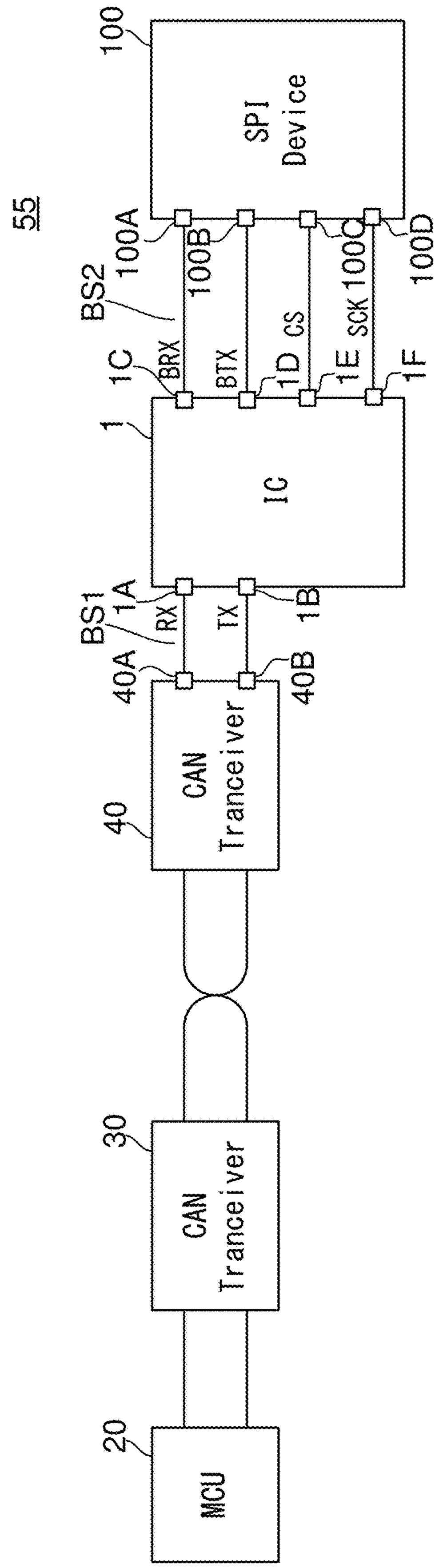
FIG. 11 is a view showing a configurational example of a communication system according to an embodiment of the disclosure.

The semiconductor device 1 of this embodiment also allows devices compatible with SPI communications to be externally connected thereto. FIG. 11 is a view showing a communication system 55 composed of the semiconductor device 1 and an SPI-compatible SPI device 100. It is noted that the SPI device 100 is configured as a semiconductor device having various functions such as a later-described motor driver.

The SPI device 100 includes an RX pin 100A, a TX pin 100B, a CS pin 100C, and an SCK pin 100D.

An RXD pin 1C of the semiconductor device 1 is connected to the RX pin 100A. A TXD pin 1D of the semiconductor device 1 is connected to the TX pin 100B. Received data BRX outputted from the RXD pin 1C is inputted to the RX pin 100A. Transmitted data BTX outputted from the TX pin 100B is inputted to the TXD pin 1D.

A CS pin 1E of the semiconductor device 1 is connected to the CS pin 100C. An SCK pin 1F of the semiconductor device 1 is connected to the SCK pin 100D. A chip select signal CS outputted from the CS pin 1E is inputted to the CS pin 100C. A clock signal SCK outputted from the SCK pin 1F is inputted to the SCK pin 100D. That is, between the semiconductor device 1 and the SPI device 100, communications by the individual signals BRX, BTX, CS, SCK are performed via the second bus BS2.

The semiconductor device 1 operates as a master, and the SPI device 100 operates as a slave. When the received data BRX is transmitted from the semiconductor device 1 to the SPI device 100, the clock signal SCK is transmitted from the semiconductor device 1 to the SPI device 100. The semiconductor device 1 makes transmission in synchronization between the clock signal SCK and the received data BRX. The SPI device 100 receives the received data BRX in synchronization with the clock signal SCK.

Also for transmission of data from the SPI device 100 to the semiconductor device 1, the clock signal SCK is transmitted from the semiconductor device 1 to the SPI device 100. The SPI device 100 transmits the transmitted data BTX in synchronization with the clock signal SCK. The semiconductor device 1 receives the transmitted data BTX in synchronization with the clock signal SCK.

Next, operations in the communication system 55 having the above-described configuration will be described in more detail. It is noted here that communication method setting information BRIFSEL as shown in FIG. 12A can be set in the register 151 of the semiconductor device 1. The communication method setting information BRIFSEL indicates a communication method with which devices connected to the semiconductor device 1 are compatible. In the case of FIG. 12A, a value of communication method setting information BRIFSEL=0 denotes UART, and BRIFSEL=1 denotes SPI. For example, connection of a UART-compatible device 10 (FIG. 3) involves setting BRIFSEL=0, connection of the SPI device 100 (FIG. 11) involves setting BRIFSEL=1. In response to the setting of BRIFSEL, operation is changed over.

In addition, various settings using the communication method setting information BRIFSEL or the like may be implemented also by resistors or the like externally connected to the semiconductor device, as an example, without being limited to settings to the register.

Figure 13:
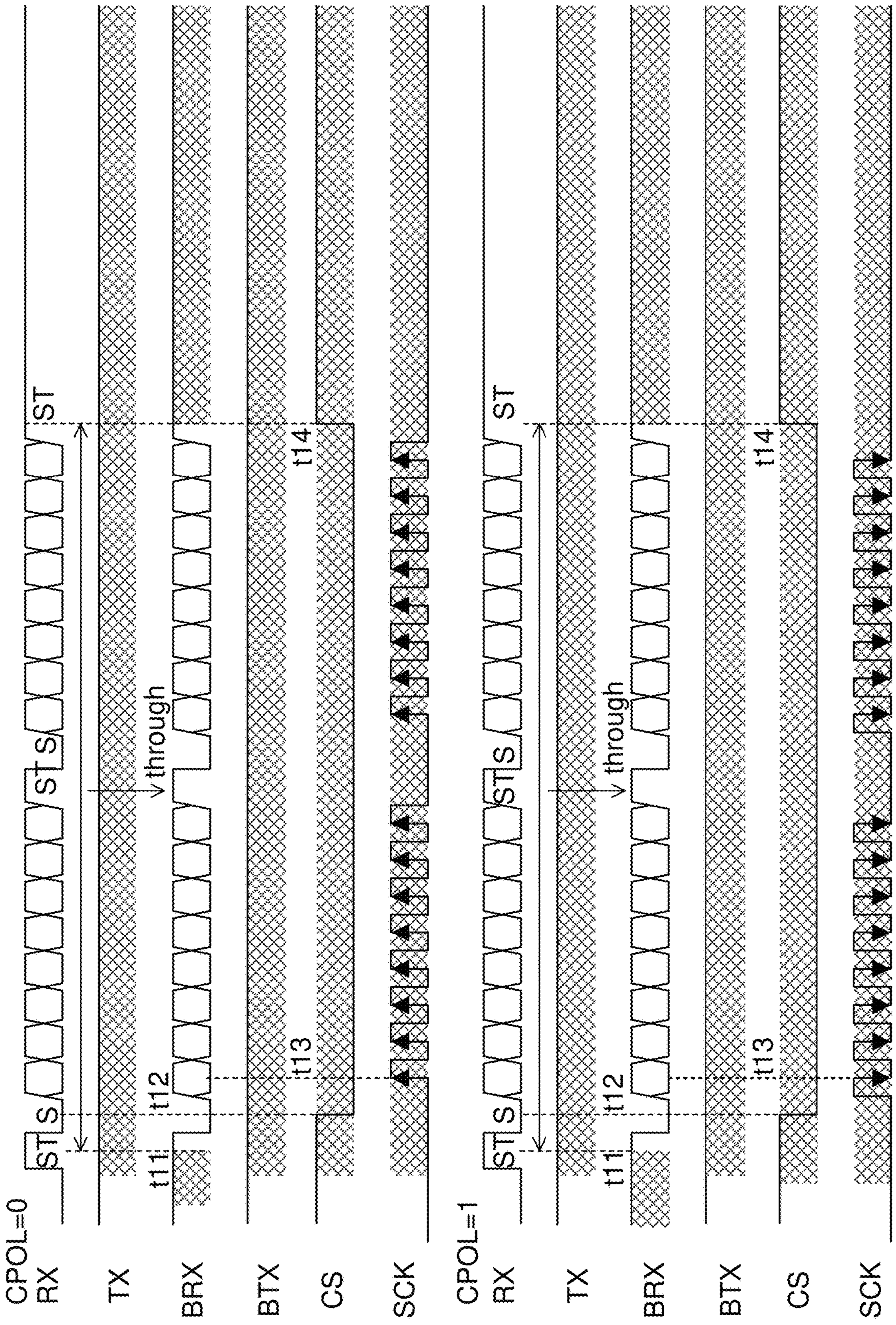
FIG. 13 is a timing chart showing an operational example in a case where a write operation is performed for an SPI device.

Operation in a write operation performed for the SPI device 100 is described below with reference to the timing chart shown in FIG. 13. In FIG. 13 (and in later-described FIG. 14), shown are, in descending order starting with the uppermost stage, waveform examples of the received data RX, the transmitted data TX, the received data BRX, the transmitted data BTX, the chip select signal CS, and the clock signal SCK.

In addition, FIG. 13 shows waveforms in individual cases divided by values of the clock edge setting information CPOL. The clock edge setting information CPOL, settable in the register 151, is information indicating an edge (rising or falling edge) of the clock signal SCK at a center of bits of the received data BRX. In the case shown in FIG. 12B, CPOL=0 denotes a rising edge, and CPOL=1 denotes a falling edge.

In FIG. 13 (and FIG. 15), hatching indicates signal control other than through output.

Figure 14:
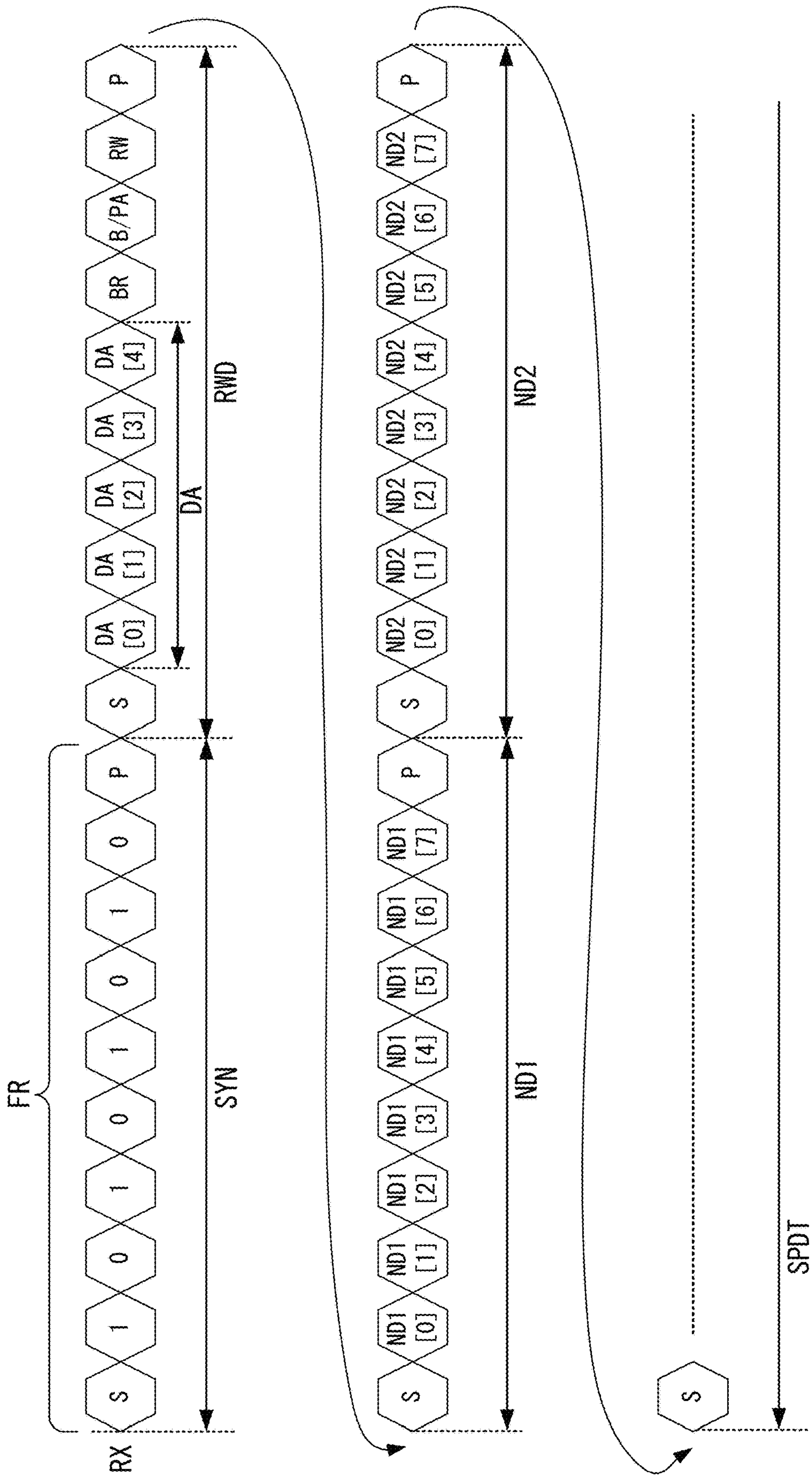
FIG. 14 is a view showing data construction of received data RX in a case where a write or read operation is performed with the SPI device assigned as a target device.

As shown in FIG. 14, the received data RX, as in FIG. 8, includes a synchronization frame SYN, a read/write etc. frame RWD, a first data number frame ND1, and a second data number frame ND2. In the received data RX shown in FIG. 14, data SPDT dedicated to the SPI device 100 is included in succession to the second data number frame ND2.

Upon receiving a start bit (low level) of the leading head of the received data RX, the control unit 15 recognizes on status of the bridge function by the bridge bit BR contained in the received data RX, as well as recognizes write status by the read/write bit RW.

Thereafter, upon receiving the second data number frame ND2, the control unit 15 makes through output of the received data RX started at the stop bit ST of the second data number frame ND2 (timing t11). As a result, the data SPDT is through-outputted as received data BRX to the SPI device 100. Then, the chip select signal CS is changed over to active at the start bit of the leading head of the data SPDT by the chip select signal output unit 16 (timing t12).

It is noted here that chip select signal setting information CSF is settable in the register 151. The chip select signal setting information CSF is information for setting a level at which the chip select signal CS is set active. For example, as shown in FIG. 12C, given that CSF=0, the chip select signal CS goes active at low level, while given that CSF=1, the chip select signal CS goes active at high level. FIG. 13 shows a case of such setting that the chip select signal CS goes active at low level.

Also, given that clock edge setting information CPOL=0, the clock signal SCK is outputted in such fashion that the rising edge coincides with a center of bits (bits sandwiched between the start bit and the stop bit) of the received data BRX resulting from through output of the data SPDT, while given that CPOL=1, the clock signal SCK is outputted in such fashion that the falling edge coincides with a center of bits of the received data BRX resulting from through output of the data SPDT (timing 13).

When the frame number of the received data RX to be through-outputted has reached a frame number indicated by the second data number frame ND2, the through output is stopped by the control unit 15 (timing t14). In this case, the frame number indicated by the second data number frame ND2 and the frame number indicated by the first data number frame ND1 are equal to each other.

Figure 15:
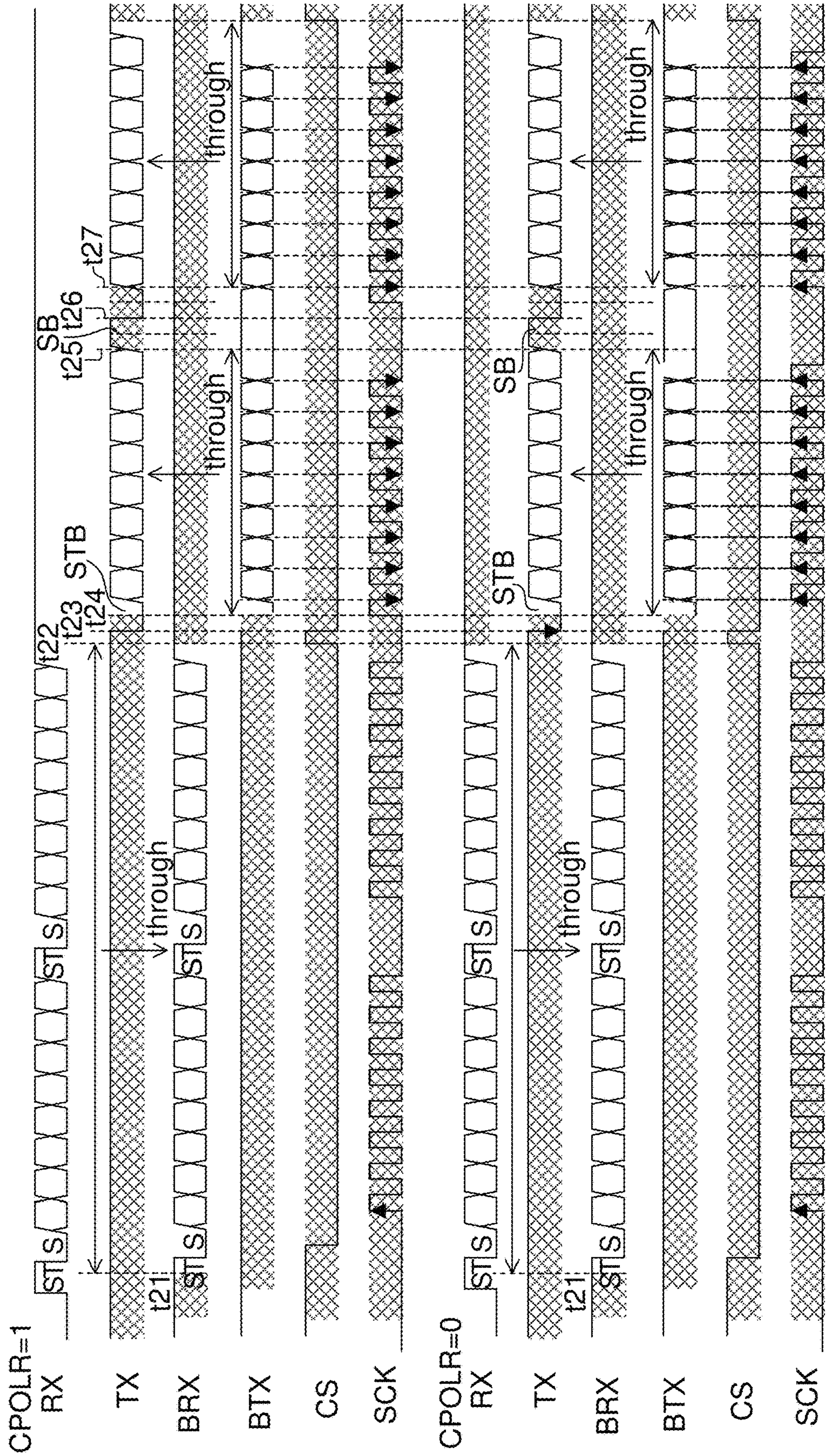
FIG. 15 is a timing chart showing an operational example in a case where a read operation is performed for the SPI device.

Next, operation for execution of a read operation for the SPI device 100 will be described with reference to the timing chart shown in FIG. 15. FIG. 15 shows waveforms in individual cases divided by values of the clock edge setting information CPOLR. The clock edge setting information CPOLR, settable in the register 151, is information indicating an edge (rising or falling edge) of the clock signal SCK at a leading head of bits of the transmitted data BTX. In the case shown in FIG. 12D, CPOLR=0 denotes a rising edge, and CPOLR=1 denotes a falling edge. Also, in FIG. 15, it is assumed that the chip select signal CS goes active at low level.

Upon receiving a start bit (low level) of the leading head of the received data RX, the control unit 15 recognizes on status of the bridge function by the bridge bit BR contained in the received data RX, as well as recognizes read status by the read/write bit RW.

Thereafter, upon receiving the second data number frame ND2, the control unit 15 makes through output of the received data RX started at the stop bit ST of the second data number frame ND2 (timing t21). Subsequent operations in through output of the data SPDT are the same as in the foregoing write operation, so detailed description is omitted. Then, upon a halt of the through output, the chip select signal CS is changed over to high level, releasing active state (timing t22).

Then, the transmitted data TX is set to low level, and moreover the chip select signal CS is changed over to low level, being set active (timing t23). Given that CPOLR=1, subsequently, the clock signal SCK is pushed to rise (timing t24). Here is started through output of the transmitted data BTX independently of CPOLR setting. As a result, the transmitted data BTX is through-outputted as transmitted data TX. In the transmitted data TX, a start bit STB is added to its leading head.

Given that CPOLR=1, the clock signal SCK goes a falling edge at the leading head of each bit of the transmitted data BTX. Given that CPOLR=0, the clock signal SCK goes a rising edge at the leading head of each bit of the transmitted data BTX.

Upon receiving the transmitted data BTX of specified bits (8 bits in FIG. 15), the control unit 15 sets the transmitted data TX to high level (timing t25). Under this situation, the through output is halted. Thereafter, the control unit 15 sets the transmitted data TX to low level (timing t26). As a result, a stop bit SB to be used in UART can be added to the transmitted data BTX transmitted from the SPI device 100, making up the transmitted data TX.

Thereafter, the through output of the transmitted data BTX is resumed (timing t27), and the clock signal SCK is outputted. When a frame number of the transmitted data TX generated based on the lately-transmitted transmitted data BTX has reached a frame number resulting from subtracting a frame number indicated by the second data number frame ND2 from a frame number indicated by the first data number frame ND1 (frame number=2 in the case of FIG. 15), processing is completed.

In this way, according to the semiconductor device 1 of this embodiment, since conversions between UART format and SPI format become implementable, the MCU 20 is enabled to perform a write or read operation for the SPI device 100 via the semiconductor device 1.

<6. Application Examples>

Figure 16:
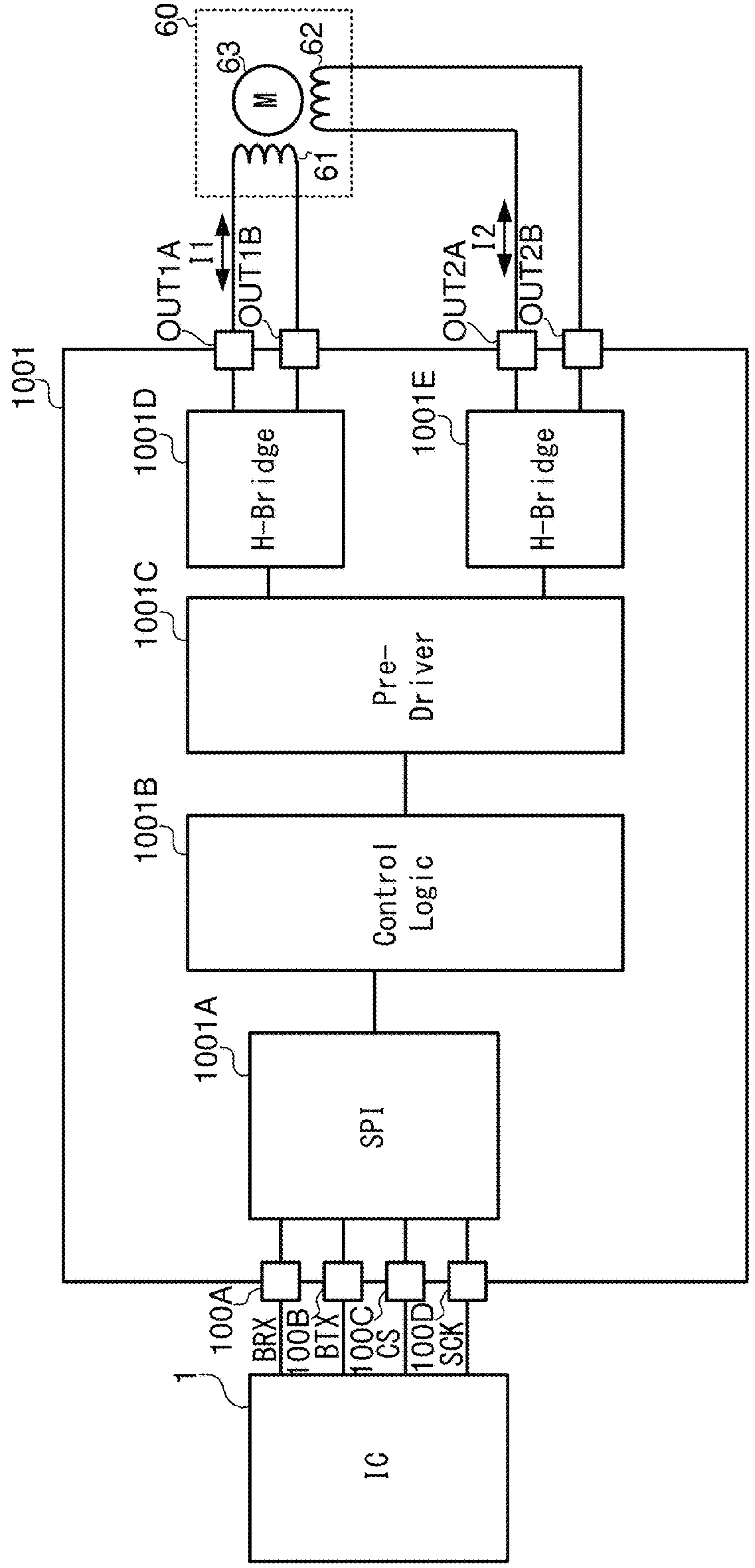
FIG. 16 is a view showing a configurational example of a motor driver.

Next, a motor driver as a concrete example of the SPI device 100 according to this embodiment will be described. FIG. 16 is a view showing a schematic configuration of a motor driver 1001.

The motor driver 1001 is configured so as to drive a two-phase excitation type stepping motor 60 (hereinafter, abbreviated simply as motor 60). The motor 60 includes an exciting coil 61 of a first excitation phase, an exciting coil 62 of a second excitation phase, and a rotor 63. For rotational drive of the motor 60, drive currents 11, 12 are fed from the motor driver 1001 to the exciting coils 61, 62, respectively.

The motor driver 1001 includes, as integrated together, an SPI communication unit 1001A, a control logic unit 1001B, a predriver 1001C, a half bridge 1001D, and a half bridge 1001E. The motor driver 1001 also has, as external terminals for establishment of electrical connection with the external, an RX pin 100A, a TX pin 100B, a CS pin 100C, and an SCK pin 100D. The motor driver 1001 further has, as external terminals, output pins OUT1A, OUT1B, OUT2A, and OUT2B.

The SPI communication unit 1001A performs SPI communications with the semiconductor device 1. That is, communications using received data BRX, transmitted data BTX, a chip select signal CS, and a clock signal SCK are performed as shown in FIG. 16. Since the semiconductor device 1 is capable of conversion between UART and SPI as described before, the SPI communication unit 1001A is enabled to communicate with an unshown MCU via the semiconductor device 1. By virtue of the SPI communication unit 1001A being provided, it becomes implementable to make various settings for the motor driver 1001, or output status of the motor driver 1001, and so on.

The control logic unit 1001B controls the motor driver 1001 comprehensively. The predriver 1001C drives the half bridges 1001D, 1001E under control of the control logic unit 1001B. The half bridge 1001D generates voltage signals that arise at the output pins OUTIA, OUT1B to control the drive current 11. The half bridge 1001E generates voltage signals that arise at the output pins OUT2A, OUT2B to control the drive current 12.

<7. Vehicle>

Figure 17:
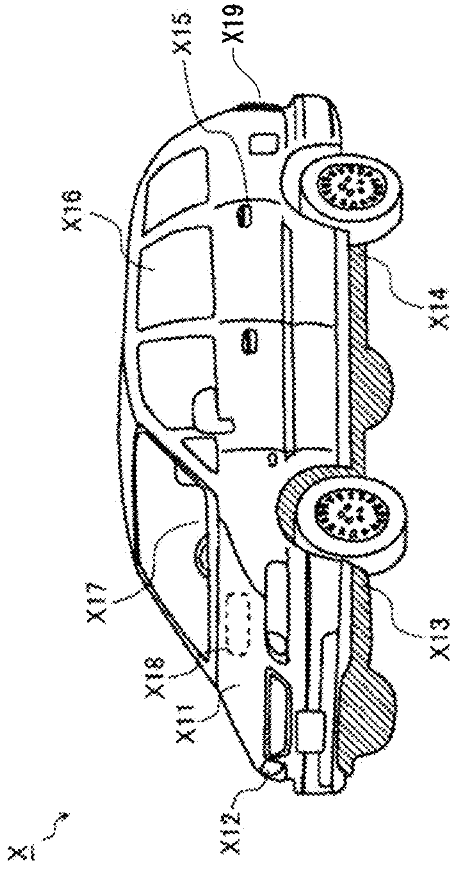
FIG. 17 is an appearance view showing an example of a vehicle.

FIG. 17 is an appearance view showing a configurational example of a vehicle X. The vehicle X of this configurational example is equipped with various electronic devices X11-X18 that operate under power supply from unshown batteries. It is noted that mounting positions of the electronic devices X11-X18 in FIG. 17 may be different from actual ones, for drawing convenience's sake.

The electronic device X11 is an engine control unit for implementing engine-related control (injection control, electronic throttle control, idling control, oxygen sensor heater control, auto-cruise control, etc.).

The electronic device X12 is a lamp control unit for implementing switching on/off control of HID (High Intensity Discharged lamp) or DRL (Daytime Running Lamp) or the like.

The electronic device X13 is a transmission control unit for implementing control related to transmission.

The electronic device X14 is a body control unit for implementing control related to motions of the vehicle X (ABS (Anti-lock Brake System) control, EPS (Electric Power Steering) control, electronic suspension control, etc.).

The electronic device X15 is a security control unit for implementing drive control of door locks, a security alarm, and the like.

The electronic device X16 is an electronic device incorporated in the vehicle X at a factory shipping phase as standard equipment or manufacturer optional articles such as wiper, electric door mirror, power window, damper (shock absorber), electric sunroof, electric sheet, etc.

The electronic device X17 is an electronic device which may be set on the vehicle X at user's discretion as user's option such as on-vehicle A/V (Audio/Visual) equipment, car navigation system, and ETC (Electronic Toll Collection system), and the like.

The electronic device X18 is an electronic device equipped with a high pressure-resistant motor such as on-vehicle blower, oil pump, water pump, battery cooling fan, and the like.

The communication system and the motor 60, with the above-described semiconductor device 1 and the motor driver 1001 (SPI device) included therein, may be used for drive of any one of the electronic devices X11-X18. Also, in cases where the vehicle X is an electric vehicle or a hybrid vehicle, the foregoing motor driver 1001 may also be applied as a means for controlling a wheel-driving motor.

<8. Others>

It should be noted that various technical features disclosed herein may be embodied not only as in the above-described embodiment but also as changed or modified in various ways without deviating from the gist of the disclosure's technical creation. That is, the above-described embodiment should be construed as not being limitative but being an exemplification at all points. The technical scope of the disclosure should not be limited to the embodiment, and it should be construed that all changes and modifications equivalent in sense and scope to the appended claims are included in the technical scope of the disclosure.

<9. Appendix>

As described hereinabove, a semiconductor device (1) according to one aspect of the present disclosure is a semiconductor device connectable to an external transmission unit (20) via a first bus (BS1) and also connectable to an external first device (100) via a second bus (BS2), the semiconductor device comprising:

- a first reception unit (11) configured so as to be enabled to receive received data (RX), which is serial data, from the transmission unit via the first bus by a first serial communication method;
- a first transmission unit (12) configured so as to be connectable to the first device via the second bus;
- a clock signal output unit (17) configured so as to output a clock signal (SCK) to the first device; and
- a chip select signal output unit (16) configured so as to output a chip select signal (CS) to the first device, wherein
- the first reception unit and the first transmission unit are so configured that when bridge select data (BR) contained in the received data indicates on status of through output of bit data, i.e. output of bit data as it is intact, between the first bus and the second bus, the first reception unit and the first transmission unit through-output first device-dedicated data (SPDT), which is contained in the received data, to the second bus,
- the clock signal output unit is so configured that when the bridge select data indicates on status of the through output and when communication by a specified second serial communication method dedicated to the first device has been set to the semiconductor device, the clock signal output unit outputs a clock signal synchronized with data of the through output, and the chip select signal output unit is so configured that when the bridge select data indicates on status of the through output and when communication by the second serial communication method has been set to the semiconductor device, the chip select signal output unit outputs a chip select signal (first configuration).

In the first configuration, it is also allowable that setting of the second serial communication method is implemented by setting to a register included in the semiconductor device (second configuration).

In the first or second configuration, the following modification may be made: a second device (10) compatible with the first serial communication method is connectable to the semiconductor device, the second serial communication method or the first serial communication method is settable to the semiconductor device, and when the first serial communication method has been set and when the bridge select data indicates on status of the through output, the first reception unit and the first transmission unit through-output data dedicated to the second device, the data being contained in the received data, to the second bus (third configuration).

In any one of the first to third configurations, it is also allowable that setting for selection of an edge type to be synchronized with data dedicated to the first device in the clock signal is implementable (fourth configuration).

In any one of the first to fourth configurations, it is also allowable that a level corresponding to active assertion of the chip select signal is settable (fifth configuration).

In any one of the first to fifth configurations, the following modification may be made: the semiconductor device further comprises:

a second reception unit (13) configured so as to be connectable to the first device via the second bus; and a second transmission unit (14) configured so as to be connectable to the transmission unit via the first bus, wherein when the bridge select data indicates on status of through output and when read/write select data (RW) contained in the received data indicates read status, transmitted data, which is serial data received by the second reception unit from the first device, is through-outputted from the second transmission unit to the first bus, and during through output to the first bus, a start bit and a stop bit are added to the transmitted data (sixth configuration).

In the sixth configuration, it is also allowable that during through output to the first bus, the clock signal output unit generates the clock signal synchronized with the transmitted data (seventh configuration).

In the seventh configuration, it is also allowable that setting for selecting an edge type to be synchronized with the transmitted data in the clock signal is settable (eighth configuration).

In any one of the first to eighth configurations, it is also allowable that the first serial communication method is UART and moreover the second serial communication method is SPI (ninth configuration).

A communication system (55) according to one aspect of the present disclosure comprises the semiconductor device (1) having any one of the first to ninth configurations, the transmission unit (20), and the first device (100) (tenth configuration).

In the tenth configuration, it is also allowable that the first device is configured as a motor driver (eleventh configuration).

In the eleventh configuration, it is also allowable that the communication system is mountable on a vehicle (twelfth configuration).

Disclosure of Second Technology

Figure 18:
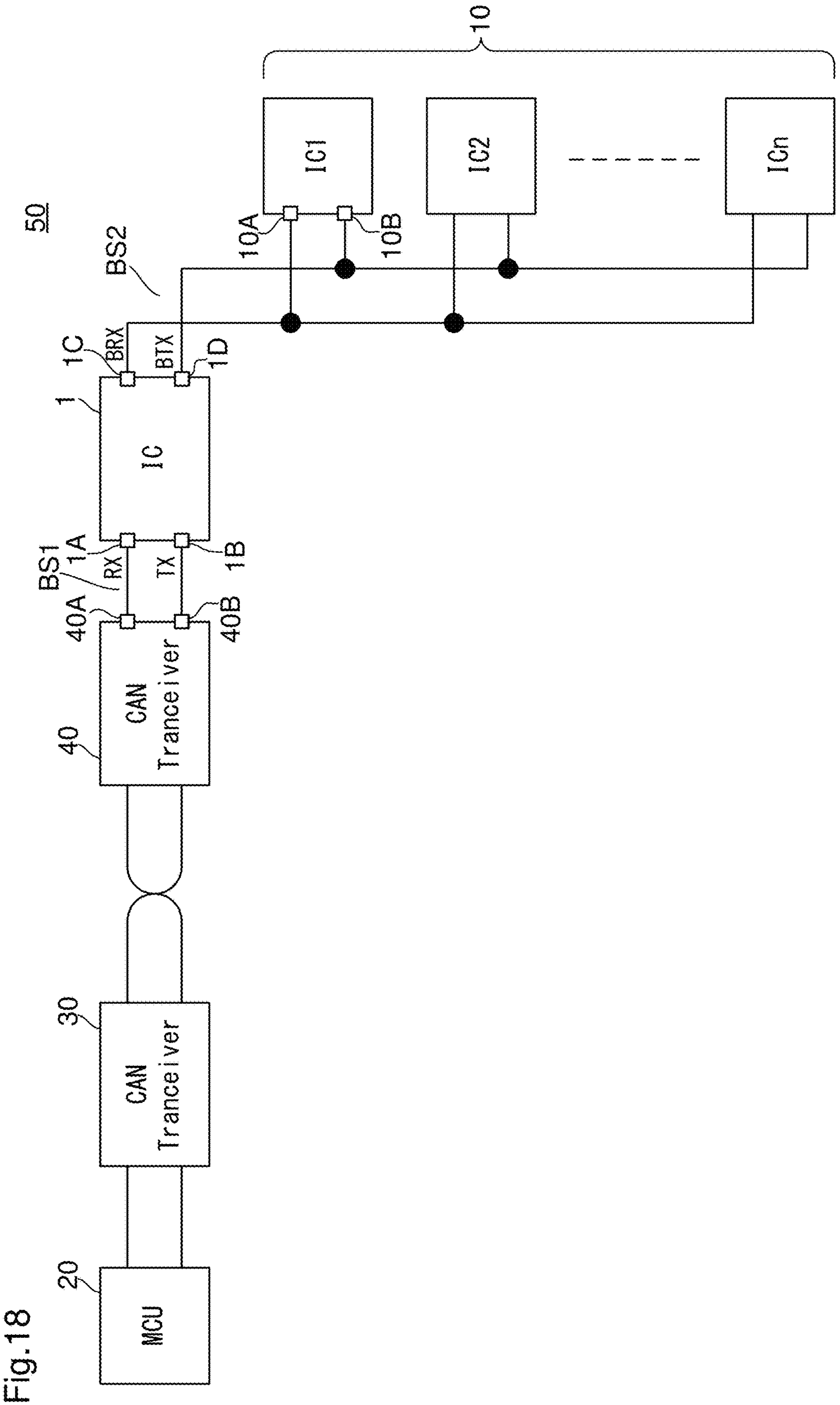
FIG. 18 is a view showing a configuration of a communication system according to an exemplary embodiment of the disclosure.

FIG. 18 is a view showing a configuration of a communication system 50 according to an exemplary embodiment of the disclosure.

With the configuration shown in FIG. 18, UART communications are performed between the CAN transceiver 40, the semiconductor device 1, and the n devices 10. That is, both buses BS1 and BS2 are compatible with UART. The semiconductor device 1 has an RXD (received data output) pin 1C and a TXD (transmitted data input) pin 1D in addition to the RX pin 1A and the TX pin 1B. The RX pin 1A is connected to the RXD pin 40A of the CAN transceiver 40. The TX pin 1B is connected to the TXD pin 40B of the CAN transceiver 40. That is, the RX pin 1A and the TX pin 1B are connected to the RXD pin 40A and the TXD pin 40B, respectively, by the bus BS1. Communications of received data RX and transmitted data TX are enabled via the bus BS1. The received data RX and the transmitted data TX are serial data.

The RXD pin 1C is connected to RX pins 10A of the n devices 10. The TXD pin 1D is connected to TX pins 10B of the n devices 10. That is, the RXD pin 1C and the TXD pin 1D are connected to the RX pins 10A and the TX pins 10B, respectively, by the bus (local bus) BS2. Communications of received data BRX and transmitted data BTX are enabled via the bus BS2. The received data BRX and the transmitted data BTX are serial data.

In the configuration of the embodiment of the disclosure shown in FIG. 18, the semiconductor device 1 and the n devices 10 differ from each other in terms of compatible protocol. When the CAN transceiver 40 performs a write or read operation for the semiconductor device 1, received data RX outputted from the RXD pin 40A to the RX pin 1A consists of only data compatible with the protocol of the semiconductor device 1. It is noted here that a write operation refers to a process of writing data to a target device, and a read operation refers to a process of reading data from a target device. In a case of a read operation, the semiconductor device 1, upon receiving received data RX, outputs transmitted data TX from the TX pin 1B to the TXD pin 40B.

Meanwhile, when the CAN transceiver 40 performs a write or read operation for the devices 10, received data RX to be outputted from the RXD pin 40A to the RX pin 1A includes data compatible with the protocol of the devices 10. In this case, the semiconductor device 1 turns on the bridge function, allowing the data contained in the received data RX and compatible with the protocol of the devices 10 to be through-outputted from the RXD pin 1C as received data BRX. The terms 'through output' means to output bit data as it is intact. A device address of a device 10 is assigned to the received data BRX.

For a read operation, a device 10 as the target device (a device assigned by the device address) outputs transmitted data BTX from the TX pin 10B to the TXD pin 1D. The semiconductor device 1, because of the on-status bridge function, through-outputs the transmitted data BTX as transmitted data TX from the TX pin 1B.

According to this embodiment of the disclosure, as described above, even when the semiconductor device 1 and the devices 10 differ from each other in protocol, the CAN transceiver 40 is enabled to perform write and read for the semiconductor device 1 and the devices 10. In contrast to the second comparative example (FIG. 2), it is implementable to reduce the number of CAN transceivers and reduce the quantity of interconnects, contributing to cost reduction.

<2. Configuration of Semiconductor Device>

Figure 19:
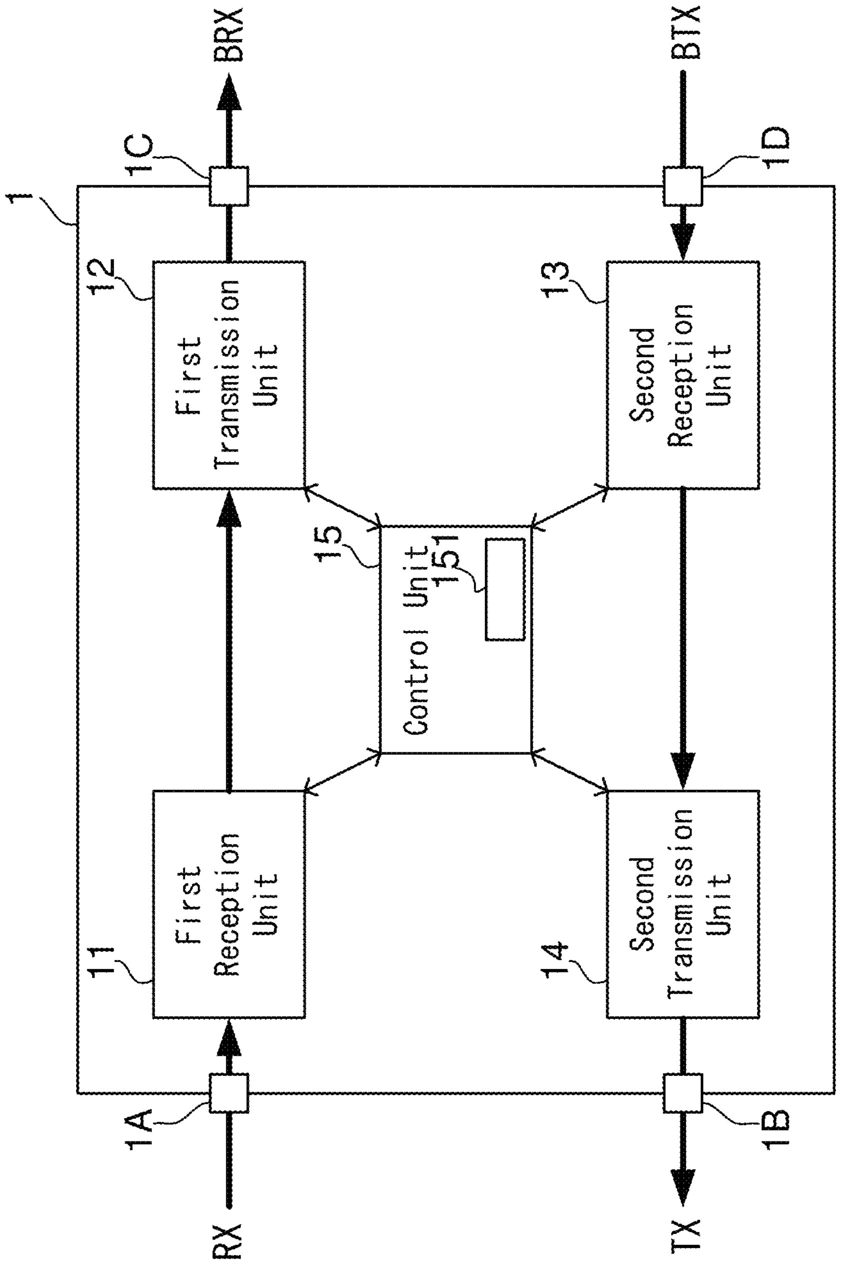
FIG. 19 is a block diagram of a semiconductor device according to an exemplary embodiment of the disclosure.

FIG. 19 is a block diagram of a semiconductor device 1 according to an exemplary embodiment of the disclosure. The semiconductor device 1 is equipped with a functional block including a first reception unit 11, a first transmission unit 12, a second reception unit 13, a second transmission unit 14, and a control unit 15. Whereas FIG. 19 depicts only a functional block related to communication functions, other functional blocks may also be provided. For instance, the semiconductor device 1, when given by an LED driver, is equipped with a functional block related to LED drive.

The first reception unit 11 receives received data RX via an RX pin 1A. The first transmission unit 12 outputs received data BRX via an RXD pin 1C. The second reception unit 13 receives transmitted data BTX via a TXD pin 1D. The second transmission unit 14 outputs transmitted data TX via a TX pin 1B.

The control unit 15 controls the first reception unit 11, the first transmission unit 12, the second reception unit 13, and the second transmission unit 14. The control unit 15 includes a register 151.

<3. Construction of Received Data>

Figure 20:
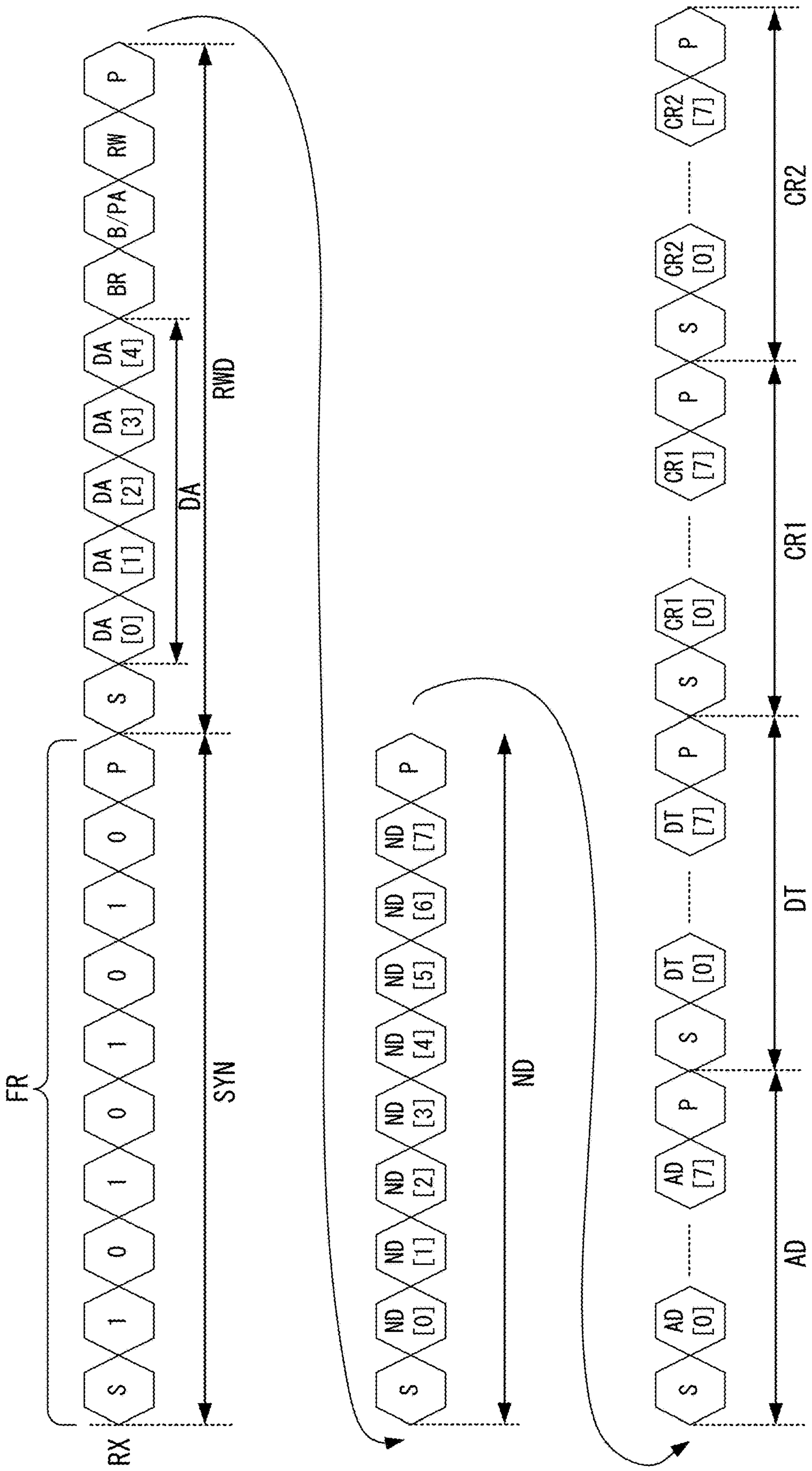
FIG. 20 is a view showing data construction of received data RX in a case where a write or read operation is performed with a semiconductor device 1 assigned as a target device.

FIG. 20 is a view showing data construction of received data RX in a case where a write or read operation is performed with the semiconductor device 1 assigned as a target device (i.e., a case where the bridge function is out of use). The received data RX shown in FIG. 20 consists of only data compatible with a protocol of the semiconductor device 1.

In UART, communications are performed in data units called frame. As shown in FIG. 20, a frame FR consists of bit data ranging from a start bit S to a stop bit P. The start bit S goes low level, and the stop bit P goes high level. Bit data counting a specified number of bits are placed between the start bit S and the stop bit P. In the case of FIG. 20, bit data of 8 bits are placed. That is, the frame FR is composed of bit data counting 10 bits.

As shown in FIG. 20, the received data RX contains a synchronization frame SYN, a read/write etc. frame RWD, a data number frame ND, a register address frame AD, a data frame DT, and CRC (Cyclic Redundancy Check) frames CR1 and CR2, in this order starting with the leading head.

The synchronization frame SYN is bit data for setting a baud rate to the semiconductor device 1.

The read/write etc. frame RWD contains a device address DA, a bridge bit BR, a broadcast/parity bit B/PA, and a read/write bit RW. The device address DA is bit data indicating an address of a target device (semiconductor device 1) (5-bit data in the case of FIG. 20). The bridge bit BR is bit data indicating on/off status of the bridge function of the semiconductor device 1. The broadcast/parity bit B/PA is bit data indicating on/off status of broadcast or parity status of the device address DA in the semiconductor device 1. The read/write bit RW is bit data indicating read or write.

In this connection, a value of bridge bit BR=0 denotes off status of bridge function, i.e., normal mode (bridge function is set to off in the received data RX shown in FIG. 20). In this case, the broadcast/parity bit B/PA indicates on/off status of broadcast. Broadcast/parity bit B/PA=0 indicates off status of broadcast, and broadcast/parity bit B/PA=1 indicates on status of broadcast.

In addition, for implementation of the broadcast of the semiconductor device 1, as shown in FIG. 7, a plurality of semiconductor devices 1 are connected to the CAN transceiver 40. Devices 10 are connected to each semiconductor device 1. Given that the broadcast is on, all of the plurality of semiconductor device 1 are target devices.

The expression, bridge bit BR=1, indicates on status of the bridge function (bridge function is set to on in later-described received data RX shown in FIG. 21). In this case, the broadcast/parity bit B/PA serves as a parity of the device address DA. As a result of this, it becomes possible to implement error detection of the device address DA. In addition, in the configuration shown in FIG. 7, given that the groups of devices 10 connected to the plurality of semiconductor devices 1, respectively, differ in protocol on the group basis, setting the broadcast of a semiconductor device 1 to on status would cause the same received data RX to be transmitted as received data BRX to devices 10 of different protocols, with a result that some of the devices 10 encounter a protocol incompatibility. Thus, when the bridge function is set on, the broadcast should be suppressed.

The data number frame ND is bit data indicating a frame number of the data frame DT.

The register address frame AD is bit data indicating an address in the register 151. The data frame DT is bit data indicating data proper to be transmitted by received data RX. The CRC frames CR1, CR2 are bit data each indicating an error detecting code to be added with the frames RWD, ND, AD, DT taken as error detection targets. In addition, although the data frame DT is given by one frame in the case of FIG. 20, yet two or more frames may be included in the received data RX. In such a case, the CRC frames CR1 and CR2 follow the data frame DT of two or more frames.

Figure 21:
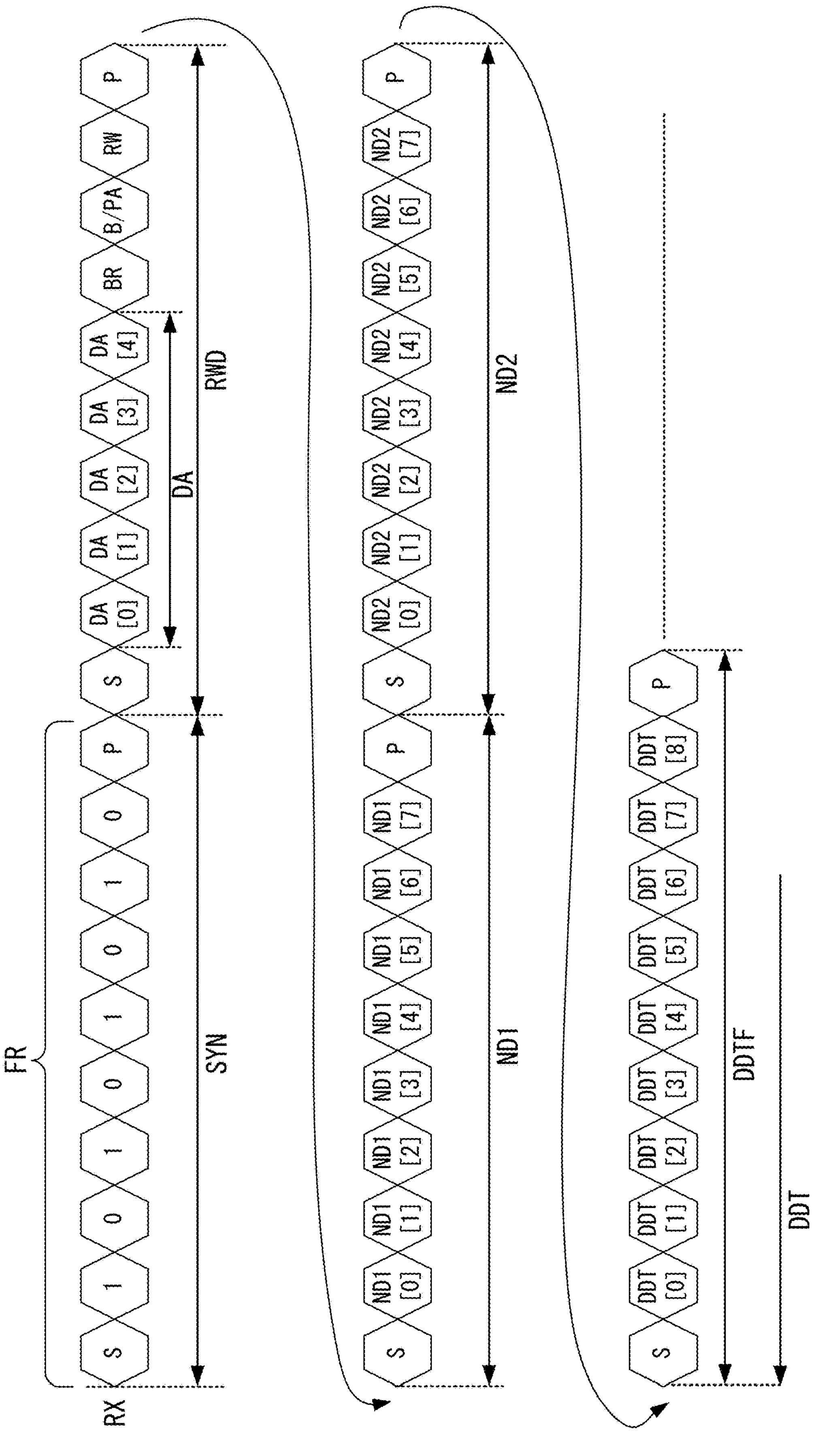
FIG. 21 is a view showing data construction of received data RX in a case where a write or read operation is performed with a device 10 assigned as a target device.

FIG. 21 is a view showing data construction of received data RX in a case where a write or read operation is performed with a device 10 assigned as a target device (i.e., a case where the bridge function is used). The synchronization frame SYN and the read/write etc. frame RWD in the received data RX shown in FIG. 21 are as described above.

In the received data RX shown in FIG. 21, the read/write etc. frame RWD is succeeded by a first data number frame ND1 and a second data number frame ND2. The first data number frame ND1 is bit data indicating a total number of frames. The second data number frame ND2 is bit data indicating a number of frames of write-dedicated data for a target device (device 10 with the bridge function in use). For write processing on the target device, there is agreement between a frame number indicated by the second data number frame ND2 and a frame number indicated by the first data number frame ND1. For read processing on the target device, a frame number obtained by subtracting a frame number indicated by the second data number frame ND2 from a frame number indicated by the first data number frame ND1 results in a frame number of data (readout data) that is returned from the target device to the semiconductor device 1.

In the received data RX shown in FIG. 21, the second data number frame ND2 is succeeded by device data DDT. The device data DDT is data which is compatible with the protocol of the devices 10 and which is an object that is through-outputted as the received data BRX. The device data DDT includes a device data frame DDTF.

In the example of FIG. 21, the device data frame DDTF has a bit number, 9 bits, of data bits DDT between the start bit S and the stop bit P. That is, there is a difference from a bit number (=8 bits) between the start bit S and the stop bit P in each frame (SYN, RWD, ND1, ND2) placed forward of the device data DDT in the received data RX. Like this, in terms of the bit number between start bit and stop bit in frames, it becomes practicable to manage such cases as the device 10 differs in corresponding bit number from the semiconductor device 1. Such differences in corresponding bit number are included in differences in compatible protocol.

In addition, the devices 10 and the semiconductor device 1 may be not different from each other, i.e. equal to each other, in terms of corresponding bit number. For instance, both the devices 10 and the semiconductor device 1 may be corresponding to 8 bits. Further, for instance, in a case where the device data frame DDTF has a bit number of 9 bits between start bit and stop bit, the start bit may be added to each frame (SYN, RWD, ND1, ND2) placed forward (header part) of the device data DDT while the stop bit of 2 bits may be added rearward of the 8-bit data bits. Such arrangement allows the MCU 20 to treat the header-part frame and the device data frame DDTF as having an equal bit number of 9 bits between the start bit and the stop bit. Further, the semiconductor device 1, keeping synchronization by the start bit subsequent to the stop bit, is allowed to treat the header part as 8 bits (to ignore the stop bit).

Also, in the device data DDT, any one of device data frame DDTF corresponds to a device address. The device address represents an address of a device 10 that is a target device. A position where the device address is allocated in the device data DDT comes to a position responsive to the protocol of the device 10.

<4. Setting of Bit Number>

In this embodiment, the bit number of data bits between the start bit S and the stop bit P in the device data frame DDTF with which the device 10 is compatible can be set to the register 151 in the semiconductor device 1. FIG. 22 shows bridge mode information BRMODE, which is setting information as to the above-described corresponding bit number. The bridge mode information BRMODE is used to detect a length of one frame of the device data frame DDTF. In the case of FIG. 22, the bridge mode information BRMODE is 2-bit data, to which a bit number of data bits in the device data frame DDTF (referred to also as bridge data) is set in response to a value of BRMODE. In the case of FIG. 22, for BRMODE=0, a bit number-8 bits is set; for BRMODE=1, a bit number=9 bits is set; and for BRMODE=2 or 3, a bit number=10 bits is set. FIG. 22 shows a case where the bit number between the start bit and the stop bit in frames for the semiconductor device 1 is 8 bits. That is, with BRMODE=0, the semiconductor device 1 and the devices 10 are equal in corresponding bit number to each other; and with BRMODE=1, 2 or 3, the semiconductor device 1 and the devices 10 are different in corresponding bit number from each other.

<5. Through Output Control>

Here is described through output control by the semiconductor device 1, i.e., control under on status of the bridge function.

FIG. 9 is a timing chart showing communication control in a case where a write operation is performed for a device 10. FIG. 9 shows, in descending order starting with the uppermost stage, received data RX, a received data output select signal (RX output select), a transmitted data output select signal (TX output select), received data BRX, transmitted data BTX, and transmitted data TX (this is applicable also to FIG. 10 described later). The received data RX is of the construction shown in FIG. 21.

The received data RX is received by the first reception unit 11 (FIG. 19). Upon receiving a leading-head start bit S1 (low level) of the received data RX, the control unit 15 recognizes a reception start of the received data RX. Thereafter, the control unit 15 recognizes on status of the bridge function by the bridge bit BR contained in the received data RX, as well as recognizes a task of write by the read/write bit RW.

Thereafter, upon receiving the second data number frame ND2, the control unit 15 sets the received data output select signal in the register 151 from low to high level (timing t1) at the stop bit P1 of the second data number frame ND2. As a result, through output of the received data RX gets started, so that the first reception unit 11 and the first transmission unit 12 output the received data RX, as it is, as received data BRX. That is, device data DDT (FIG. 21) is through-outputted.

When the received data output select signal goes high level, the control unit 15 starts to count number of frames of the received data RX under reception (i.e., number of frames of the device data frame DDTF in the device data DDT). It is noted that the number of frames of the device data frame DDTF is counted on a basis that a total bit number obtained by summing up a number of bits set by the foregoing bridge mode information BRMODE and the start bit and the stop bit is regarded as one frame. For example, in the case of FIG. 22, for BRMODE=1, the total bit number=9 bits+1 bit+1 bit=11 bits.

When the counted frame number has reached a frame number indicated by the second data number frame ND2 that has been received, the control unit 15 changes over the received data output select signal to low level, stopping the through output (timing t2). From this afterward, the received data BRX is high-level fixed. In addition, in this case, the frame number indicated by the second data number frame ND2 and the frame number indicated by the first data number frame ND1 become identical to each other.

As seen above, in the write processing, device data frame DDTF corresponding to the bit number set by the bridge mode information BRMODE is delivered to the device 10 by through output of the device data DDT.

FIG. 10 is a timing chart showing communication control in a case where a read operation is performed for a device 10. In this case, the received data RX is of the construction shown in FIG. 21.

Upon receiving the start bit S1 (low level) at the leading head of the received data RX, the control unit 15 recognizes on status of the bridge function by the bridge bit BR contained in the received data RX, as well as recognizes read status by the read/write bit RW.

Thereafter, upon receiving the second data number frame ND2, the control unit 15 sets both the received data output select signal and the transmitted data output select signal in the register 151 from low to high level (timing t1) at the stop bit P1 of the second data number frame ND2. As a result, through output of the received data RX and the transmitted data BTX gets started. The first reception unit 11 and the first transmission unit 12 output the received data RX, as it is, as received data BRX, i.e., device data DDT (FIG. 21) is through-outputted. After completion of the output of the received data BRX, the second reception unit 13 and the second transmission unit 14 through-output the transmitted data BTX, which is transmitted from the device 10, as transmitted data TX.

When both the received data output select signal and the transmitted data output select signal go high level, the control unit 15 starts to count number of frames of the received data RX under reception. When a sum of a frame number resulting from counting of the received data RX and a frame number resulting from counting the transmitted data BTX that is subsequently received has reached a frame number indicated by the first data number frame ND1, the control unit 15 changes over both the received data output select signal and the transmitted data output select signal to low level, stopping the through output (timing t2). From this afterward, the transmitted data TX is Hi-z (high impedance) fixed.

Counting of individual numbers of frames of the received data RX and the transmitted data BTX, respectively, is performed on a basis that a total bit number obtained by summing up a number of bits set by the foregoing bridge mode information BRMODE and the start bit and the stop bit is regarded as one frame.

As seen above, in the read processing, device data frame DDTF corresponding to the bit number set by the bridge mode information BRMODE is delivered to the device 10 by through output of the device data DDT. Further, transmitted data BTX containing frames corresponding to the foregoing bit number is through-outputted as transmitted data TX.

Furthermore, a condition for an end of the through output can be given by the number of frames that the semiconductor device 1 has received. Particularly in this embodiment, even when transmission of the received data RX from the MCU 20 has been intercepted by interrupt process in the MCU 20, counting of the frame number stays paused during the interception, so that erroneous halting of the through output can be avoided. That is, since halting of the through output can be avoided independent of interrupt time, restrictions by specifications of the MCU 20 are less likely to be involved.

<6. Conversions Between UART and SPI>

FIG. 11 is a view showing a communication system 55 according to a modification of the disclosure. The communication system 55 includes the semiconductor device 1, and an SPI device 100 compatible with SPI (Serial Peripheral Interface). It is noted that the SPI device 100 is configured as a semiconductor device having various functions such as a motor driver.

The semiconductor device 1 in the communication system 55 includes a CS pin 1E and an SCK pin 1F in addition to the RXD pin 1C and the TXD pin 1D. The SPI device 100 includes an RX pin 100A, a TX pin 100B, a CS pin 100C, and an SCK pin 100D.

The RXD pin 1C of the semiconductor device 1 is connected to the RX pin 100A. The TXD pin 1D of the semiconductor device 1 is connected to the TX pin 100B. Received data BRX outputted from the RXD pin 1C is inputted to the RX pin 100A. Transmitted data BTX outputted from the TX pin 100B is inputted to the TXD pin 1D.

The CS pin 1E of the semiconductor device 1 is connected to the CS pin 100C. The SCK pin 1F of the semiconductor device 1 is connected to the SCK pin 100D. A chip select signal CS outputted from the CS pin 1E is inputted to the CS pin 100C. A clock signal SCK outputted from the SCK pin 1F is inputted to the SCK pin 100D. That is, between the semiconductor device 1 and the SPI device 100, communications by the individual signals BRX, BTX, CS, SCK are performed via the second bus BS2. This means that the second bus BS2 is compatible with SPI.

The semiconductor device 1 operates as a master, and the SPI device 100 operates as a slave. When the received data BRX is transmitted from the semiconductor device 1 to the SPI device 100, the clock signal SCK is transmitted from the semiconductor device 1 to the SPI device 100. The semiconductor device 1 exerts transmission in synchronization between the clock signal SCK and the received data BRX. The SPI device 100 receives the received data BRX in synchronization with the clock signal SCK.

Also for transmission of data from the SPI device 100 to the semiconductor device 1, the clock signal SCK is transmitted from the semiconductor device 1 to the SPI device 100. The SPI device 100 exerts transmission in synchronization between the clock signal SCK and the transmitted data BTX. The semiconductor device 1 receives the transmitted data BTX in synchronization with the clock signal SCK.

Further, the chip select signal CS can assume individual levels indicative of active and inactive statuses, respectively.

In this embodiment, the received data RX is through-outputted as received data BRX. Each frame contained in the received data BRX is given on a basis that a number of bits between the start bit and the stop bit equals a bit number set by the bridge mode information BRMODE. Further, in the semiconductor device 1, the start bit and the stop bit are added to the data of the bit number contained in the transmitted data BTX and set by the bridge mode information BRMODE, thereby making up frames that are then outputted as the transmitted data TX.

As seen above, according to the semiconductor device 1 of this embodiment, it becomes practicable to perform conversions between the UART format and the SPI format, allowing the MCU 20 to execute write or read process on the SPI device 100 via the semiconductor device 1.

<7. Vehicle>

As an example of applications of the present disclosure, a description on a vehicle is given below. FIG. 17 is an appearance view showing a configurational example of a vehicle X. The vehicle X of this configurational example is equipped with various electronic devices X11-X19 that operate under power supply from an unshown battery. It is noted that mounting positions of the electronic devices X11-X19 in FIG. 17 may be different from actual ones, for drawing convenience's sake.

The electronic device X11 is an engine control unit configured to implement engine-related control (injection control, electronic throttle control, idling control, oxygen sensor heater control, auto-cruise control, etc.).

The electronic device X12 is a lamp control unit configured to implement switching on/off control of HID (High Intensity Discharged lamp) or DRL (Daytime Running Lamp) or the like.

The electronic device X13 is a transmission control unit configured to implement control related to transmission.

The electronic device X14 is a body control unit configured to implement control related to motions of the vehicle X (ABS (Anti-lock Brake System) control, EPS (Electric Power Steering) control, electronic suspension control, etc.).

The electronic device X15 is a security control unit configured to implement drive control of door locks, security alarms, and the like.

The electronic device X16 is an electronic device incorporated in the vehicle X at a factory shipping phase as standard equipment or manufacturer optional articles such as wiper, electric door mirror, power window, damper (shock absorber), electric sunroof, electric seat, etc.

The electronic device X17 is an electronic device which may be set on the vehicle X at user's discretion as user's option such as on-vehicle A/V (Audio/Visual) equipment, car navigation system, and ETC (Electronic Toll Collection system), and the like.

The electronic device X18 is an electronic device equipped with a high pressure-resistant motor such as on-vehicle blower, oil pump, water pump, battery cooling fan, and the like.

The electronic device X19 is a lamp control unit configured to implement switching on/off control of taillights, stoplights, turn lights, and the like.

In addition, in cases where the communication system 50 including the semiconductor device 1 and the device 10 as described above is applied to the vehicle X, for example, when the device 10 is a matrix switch IC, the communication system 50 is applicable to the electronic device X12 or X19 as an example. In cases where the communication system 55 including the semiconductor device 1 and the SPI device 100 as described above is applied to the vehicle X, for example, when the SPI device 100 is a motor driver, the communication system 55 may be used for drive of any one of the electronic devices X11-X18. Also, when the vehicle X is an electric car or a hybrid car, the above-mentioned motor driver may also be applied as a means for controlling a wheel-driving motor.

<8. Others>

It should be noted that various technical features disclosed herein may be embodied not only as in the above-described embodiment but also as changed or modified in various ways without deviating from the gist of the disclosure's technical creation. That is, the above-described embodiment should be construed as not being limitative but being an exemplification at all points. The technical scope of the disclosure should not be limited to the embodiment, and it should be construed that all changes and modifications equivalent in sense and scope to the appended claims are included in the technical scope of the disclosure.

<9. Appendix>

As described above, according to one aspect of the present disclosure, there is provided a semiconductor device (1) connectable to an external transmitter (20) via a first bus (BS1) and also connectable to an external device (10) via a second bus (BS2), the semiconductor device comprising:

a first reception unit (11) configured so as to be enabled to receive received data (RX), which is serial data, from the transmitter via the first bus; and a first transmission unit (12) configured so as to be connectable to the device via the second bus, wherein the first reception unit and the first transmission unit are so configured that when bridge select data (BR) contained in the received data indicates on status of through output of bit data, i.e. output of bit data as it is intact, between the first bus and the second bus, the first reception unit and the first transmission unit through-output, to the second bus, data (DDT) which is contained in the received data (RX) and which is compatible with a protocol of the device, and it is implementable that a first bit number, which is a number of bits counted in data bits ranging between a start bit and a stop bit in a frame (SYN, RWD, ND1, ND2) preceding the through output contained in the received data, and a second bit number, which is a number of bits counted in data bits ranging between a start bit and a stop bit in a frame of data outputted to the device by the through output, are made different from each other (first configuration).

Also in the first configuration, the second bit number may be set variably so as to be different from or equal to the first bit number (second configuration).

Also in the second configuration, the semiconductor device may further comprise a register (151) enabled to set information (BRMODE) for setting of the second bit number (third configuration).

Also in any one of the first to third configurations, the first bus and the second bus may be both compatible with UART (fourth configuration).

Also in any one of the first to third configurations, it may be configured that the first bus is compatible with UART, and the second bus is compatible with a communication format other than UART (fifth configuration).

Also in the fifth configuration, the communication format may be SPI (sixth configuration).

Also in any one of the first to sixth configurations, as an allowable modification, the semiconductor device further comprises a second reception unit (13) configured so as to be connectable to the device via the second bus; and a second transmission unit (14) configured so as to be connectable to the first bus, wherein the second reception unit and the second transmission unit are configured so as to through-output, to the first bus, transmitted data (BTX) containing a frame that contains a start bit, a stop bit, and data bits of the second bit number (seventh configuration).

According to another aspect of the disclosure, there is provided a communication system (50) comprising the semiconductor device (1) according to any one of the first to seventh configurations, the transmitter, and the device (eighth configuration).

Also, the communication system of the eighth configuration may be mountable on a vehicle (ninth configuration).

What is claimed is:

1. A semiconductor device connectable to an external transmitter via a first bus and also connectable to an external first device via a second bus, the semiconductor device comprising:

a first reception unit configured so as to be enabled to receive received data, which is serial data, from the transmitter via the first bus by a first serial communication method;

a first transmission unit configured so as to be connectable to the first device via the second bus;

a clock signal output unit configured so as to output a clock signal to the first device; and a chip select signal output unit configured so as to output a chip select signal to the first device, wherein the first reception unit and the first transmission unit are so configured that when bridge select data contained in the received data indicates on status of through output of bit data that is intact between the first bus and the second bus, the first reception unit and the first transmission unit through-output first device-dedicated data, which is contained in the received data, to the second bus, the clock signal output unit is so configured that when the bridge select data indicates on status of the through output and when communication by a specified second serial communication method dedicated to the first device has been set to the semiconductor device, the clock signal output unit outputs a clock signal synchronized with data of the through output, and the chip select signal output unit is so configured that when the bridge select data indicates on status of the through output and when communication by the second serial communication method has been set to the semiconductor device, the chip select signal output unit outputs a chip select signal.

2. The semiconductor device according to claim 1, wherein setting of the second serial communication method is implemented by setting to a register included in the semiconductor device.

3. The semiconductor device according to claim 1, wherein a second device compatible with the first serial communication method is connectable to the semiconductor device, the second serial communication method or the first serial communication method is settable to the semiconductor device, and when the first serial communication method has been set and when the bridge select data indicates on status of the through output, the first reception unit and the first transmission unit through-output data dedicated to the second device, the data being contained in the received data, to the second bus.

4. The semiconductor device according to claim 1, wherein setting for selection of an edge type to be synchronized with data dedicated to the first device in the clock signal is implementable.

5. The semiconductor device according to claim 1, wherein a level corresponding to active assertion of the chip select signal is settable.

6. The semiconductor device according to claim 1, further comprising:

a second reception unit configured so as to be connectable to the first device via the second bus; and a second transmission unit configured so as to be connectable to the transmitter via the first bus, wherein when the bridge select data indicates on status of through output and when read/write select data contained in the received data indicates read status, transmitted data, which is serial data received by the second reception unit from the first device, is through-outputted from the second transmission unit to the first bus, and during through output to the first bus, a start bit and a stop bit are added to the transmitted data.

7. The semiconductor device according to claim 6, wherein during through output to the first bus, the clock signal output unit generates the clock signal synchronized with the transmitted data.

8. The semiconductor device according to claim 7, wherein setting for selecting an edge type to be synchronized with the transmitted data in the clock signal is implementable.

9. The semiconductor device according to claim 1, wherein the first serial communication method is UART and moreover the second serial communication method is SPI.

10. A communication system comprising the semiconductor device according to claim 1, the transmitter, and the first device.

11. The communication system according to claim 10, wherein the first device is configured as a motor driver.

12. The communication system according to claim 11, wherein the communication system is mountable on a vehicle.

13. A semiconductor device connectable to an external transmitter via a first bus and also connectable to an external device via a second bus, the semiconductor device comprising:

a first reception unit configured so as to be enabled to receive received data, which is serial data, from the transmitter via the first bus; and a first transmission unit configured so as to be connectable to the device via the second bus, wherein the first reception unit and the first transmission unit are so configured that when bridge select data contained in the received data indicates on status of through output of bit data that is intact between the first bus and the second bus, the first reception unit and the first transmission unit through-output, to the second bus, data which is contained in the received data and which is compatible with a protocol of the device, and it is implementable that a first bit number, which is a number of bits counted in data bits ranging between a start bit and a stop bit in a frame preceding the through output contained in the received data, and a second bit number, which is a number of bits counted in data bits ranging between a start bit and a stop bit in a frame of data outputted to the device by the through output, are made different from each other.

14. The semiconductor device according to claim 13, wherein the second bit number can be set variably so as to be different from or equal to the first bit number.

15. The semiconductor device according to claim 14, further comprising a register enabled to set information for setting of the second bit number.

16. The semiconductor device according to claim 13, wherein the first bus and the second bus are both compatible with UART.

17. The semiconductor device according to claim 13, wherein the first bus is compatible with UART, and the second bus is compatible with a communication format other than UART.

18. The semiconductor device according to claim 17, wherein the communication format is SPI.

19. The semiconductor device according to claim 13, further comprising:

a second reception unit configured so as to be connectable to the device via the second bus; and a second transmission unit configured so as to be connectable to the first bus, wherein the second reception unit and the second transmission unit are configured so as to through-output, to the first bus, transmitted data containing a frame that contains a start bit, a stop bit, and data bits of the second bit number.

20. A communication system comprising the semiconductor device according to claim 13, the transmitter, and the device.

21. The communication system according to claim 20, wherein the communication system is mountable on a vehicle.

* * * * *